US012610099B2

(12) United States Patent
Docherty et al.

(10) Patent No.: US 12,610,099 B2
(45) Date of Patent: Apr. 21, 2026

(54) AFFINITY PROFILE SYSTEM AND METHOD

(71) Applicant: ThinkAnalytics Ltd., Glasgow (GB)

(72) Inventors: Peter Docherty, Glasgow (GB); Christopher McGuire, Glasgow (GB); Edward Young, Glasgow (GB)

(73) Assignee: THINKANALYTICS LTD., Glasgow (GB)

( * ) Notice: Subject to any disclaimer, the term of this patent is extended or adjusted under 35 U.S.C. 154(b) by 48 days.

(21) Appl. No.: 18/130,861

(22) Filed: Apr. 4, 2023

(65) Prior Publication Data

US 2024/0187669 A1 Jun. 6, 2024

(30) Foreign Application Priority Data

Dec. 2, 2022 (GB) ...................................... 2218177

(51) Int. Cl.
*H04N 21/258* (2011.01)
*G06Q 30/0251* (2023.01)
(Continued)

(52) U.S. Cl.
CPC ... *H04N 21/25891* (2013.01); *G06Q 30/0269* (2013.01); *H04N 21/252* (2013.01);
(Continued)

(58) Field of Classification Search
CPC ......... H04N 21/25891; H04N 21/4532; H04N 21/252; H04N 21/4668; H04N 21/4826;
(Continued)

(56) References Cited

U.S. PATENT DOCUMENTS 5,758,257 A 5/1998 Herz et al.
5,758,259 A 5/1998 Lawler
(Continued)

FOREIGN PATENT DOCUMENTS

EP 1317143 6/2003
EP 2207348 7/2010
(Continued)

OTHER PUBLICATIONS

ISA; International Search Report and Written Opinion dated Jan. 29, 2024 in PCT/GB2023/053117.
(Continued)

*Primary Examiner* — Jason Salce
(74) *Attorney, Agent, or Firm* — SNELL & WILMER L.L.P.

(57) ABSTRACT

A computer-implemented method of using affinity profiles to determine at least one audience category that is expected to consume a selected item of content at one or more selected time periods, the method comprises:
obtaining affinity profiles for a plurality of users of a content distribution system, wherein each affinity profile comprises at least one selected affinity category or affinity category score, and the affinity categories are selected from a stored set of affinity categories, each representing a user's affinity for a respective subject area;
monitoring consumption of items of content or other activity of the users for different time periods;
determine the likelihood of, or an expected audience measure for, the selected item of content being consumed during the or each selected time period based on the affinity profiles and the monitored consumption of content or other activity for the different time periods.

19 Claims, 29 Drawing Sheets

(51) Int. Cl.

| | |
|---|---|
| ***H04N 21/25*** | (2011.01) |
| ***H04N 21/2668*** | (2011.01) |
| ***H04N 21/442*** | (2011.01) |
| ***H04N 21/45*** | (2011.01) |
| ***H04N 21/466*** | (2011.01) |
| ***H04N 21/482*** | (2011.01) |
| ***H04N 21/81*** | (2011.01) |

(52) U.S. Cl.
CPC ... *H04N 21/25841* (2013.01); *H04N 21/2668* (2013.01); *H04N 21/44222* (2013.01); *H04N 21/4532* (2013.01); *H04N 21/4661* (2013.01); *H04N 21/4665* (2013.01); *H04N 21/4667* (2013.01); *H04N 21/4668* (2013.01); *H04N 21/482* (2013.01); *H04N 21/8126* (2013.01)

(58) Field of Classification Search
CPC .. H04N 21/84; H04N 21/251; H04N 21/4667; H04N 21/44204
See application file for complete search history.

(56) References Cited

U.S. PATENT DOCUMENTS

| | | | | |
|---|---|---|---|---|
| 6,567,814 | B1 | 5/2003 | Bankier et al. | |
| 7,805,129 | B1 | 9/2010 | Issa et al. | |
| 8,490,136 | B2 | 7/2013 | Cox et al. | |
| 8,924,993 | B1 | 12/2014 | Niebles Duque et al. | |
| 9,148,706 | B1 * | 9/2015 | Shin | H04N 21/44226 |
| 9,301,016 | B2 * | 3/2016 | Archibong | H04N 21/6125 |
| 9,699,491 | B1 | 7/2017 | Docherty et al. | |
| 9,756,390 | B1 | 9/2017 | Docherty et al. | |
| 9,906,837 | B1 | 2/2018 | Docherty et al. | |
| 9,973,797 | B1 | 5/2018 | Docherty et al. | |
| 10,091,555 | B1 | 10/2018 | Docherty et al. | |
| 10,212,468 | B1 * | 2/2019 | Sahyoun | H04N 21/23424 |
| 10,289,739 | B1 | 5/2019 | Docherty et al. | |
| 10,356,035 | B1 | 7/2019 | Gravino et al. | |
| 10,412,454 | B2 | 9/2019 | Docherty et al. | |
| 10,756,919 | B1 * | 8/2020 | Kerzner | G05D 1/0282 |
| 10,820,027 | B2 * | 10/2020 | Galuten | H04N 21/25891 |
| 10,949,880 | B2 | 3/2021 | Singh et al. | |
| 11,212,584 | B2 | 12/2021 | Docherty et al. | |
| 11,343,573 | B2 | 5/2022 | Docherty et al. | |
| 11,451,875 | B2 | 9/2022 | Kim | |
| 11,528,531 | B1 | 12/2022 | Davis et al. | |
| 11,589,094 | B2 | 2/2023 | Choudari et al. | |
| 11,902,622 | B2 | 2/2024 | Bress et al. | |
| 12,328,465 | B2 | 6/2025 | Docherty et al. | |
| 12,348,807 | B2 | 7/2025 | Docherty et al. | |
| 12,368,913 | B2 | 7/2025 | Docherty et al. | |
| 2002/0129368 | A1 | 9/2002 | Schlack et al. | |
| 2003/0097186 | A1 | 5/2003 | Gutta et al. | |
| 2003/0101451 | A1 | 5/2003 | Bentolila et al. | |
| 2003/0106064 | A1 | 6/2003 | Plourde, Jr. | |
| 2003/0188171 | A1 | 10/2003 | DeCenzo et al. | |
| 2006/0015891 | A1 | 1/2006 | Lazzaro et al. | |
| 2007/0157222 | A1 | 7/2007 | Cordray et al. | |
| 2007/0277201 | A1 | 11/2007 | Wong et al. | |
| 2008/0304812 | A1 | 12/2008 | Jin | |
| 2010/0005492 | A1 | 1/2010 | Takano et al. | |
| 2010/0031282 | A1 | 2/2010 | Torimaru | |
| 2010/0070507 | A1 | 3/2010 | Mori | |
| 2010/0191689 | A1 | 7/2010 | Cortes et al. | |
| 2010/0211636 | A1 | 8/2010 | Starkenburg et al. | |
| 2010/0251305 | A1 | 9/2010 | Kimble et al. | |
| 2011/0016482 | A1 | 1/2011 | Tidwell et al. | |
| 2011/0243529 | A1 | 10/2011 | Oryoji et al. | |
| 2012/0221952 | A1 * | 8/2012 | Chavez | H04N 21/4622 715/733 |
| 2013/0018896 | A1 | 1/2013 | Fleischman et al. | |
| 2013/0204709 | A1 | 8/2013 | Katayev | |
| 2013/0262181 | A1 | 10/2013 | Topchy et al. | |
| 2013/0290905 | A1 | 10/2013 | LuVogt et al. | |
| 2014/0029839 | A1 | 1/2014 | Mensink et al. | |
| 2014/0074650 | A1 | 3/2014 | Elias | |
| 2014/0149344 | A1 | 5/2014 | Pudipeddi et al. | |
| 2014/0173663 | A1 | 6/2014 | Boss et al. | |
| 2014/0223575 | A1 | 8/2014 | Nandi et al. | |
| 2014/0279756 | A1 | 9/2014 | Whitman | |
| 2014/0379424 | A1 | 12/2014 | Shroff | |
| 2015/0081604 | A1 * | 3/2015 | Duque | H04N 21/25883 706/12 |
| 2015/0082330 | A1 | 3/2015 | Yun et al. | |
| 2015/0082352 | A1 | 3/2015 | Cloutier | |
| 2015/0100987 | A1 | 4/2015 | Whitman et al. | |
| 2015/0156172 | A1 | 6/2015 | Nandi et al. | |
| 2015/0269488 | A1 | 9/2015 | Galai et al. | |
| 2015/0304727 | A1 | 10/2015 | Vandichalrajan | |
| 2016/0125085 | A1 | 5/2016 | Vasudevan et al. | |
| 2016/0165277 | A1 | 6/2016 | Kirillov et al. | |
| 2016/0247201 | A1 | 8/2016 | Pool et al. | |
| 2016/0274744 | A1 | 9/2016 | Neumann et al. | |
| 2017/0017649 | A1 | 1/2017 | Srinivasaraghavan | |
| 2017/0142462 | A1 | 5/2017 | Uhrich | |
| 2017/0243244 | A1 | 8/2017 | Trabelsi et al. | |
| 2017/0251070 | A1 | 8/2017 | Liu et al. | |
| 2017/0311015 | A1 | 10/2017 | Docherty et al. | |
| 2018/0157981 | A1 | 6/2018 | Albertson et al. | |
| 2018/0242050 | A1 | 8/2018 | Denslow et al. | |
| 2018/0376190 | A1 * | 12/2018 | Kaufman | H04N 21/4524 |
| 2019/0149879 | A1 | 5/2019 | Siddiq et al. | |
| 2019/0166402 | A1 | 5/2019 | Goyal et al. | |
| 2019/0272358 | A1 | 9/2019 | McCoskey et al. | |
| 2019/0303420 | A1 * | 10/2019 | Bourothu | H04N 21/4516 |
| 2019/0373332 | A1 | 12/2019 | Kim | |
| 2020/0107070 | A1 | 4/2020 | Lopatecki et al. | |
| 2020/0137438 | A1 | 4/2020 | Whitman et al. | |
| 2020/0137450 | A1 | 4/2020 | Mishra et al. | |
| 2020/0145720 | A1 | 5/2020 | Krauss et al. | |
| 2020/0221184 | A1 | 7/2020 | Skliba et al. | |
| 2020/0252690 | A1 | 8/2020 | Docherty et al. | |
| 2020/0257934 | A1 | 8/2020 | Bastiman et al. | |
| 2020/0320571 | A1 | 10/2020 | Singh et al. | |
| 2021/0004420 | A1 | 1/2021 | Mittal et al. | |
| 2021/0306688 | A1 | 9/2021 | Bress et al. | |
| 2021/0357418 | A1 | 11/2021 | Chung et al. | |
| 2022/0019689 | A1 | 1/2022 | Lau et al. | |
| 2022/0256219 | A1 | 8/2022 | Saafi | |
| 2022/0286722 | A1 | 9/2022 | Milavsky et al. | |
| 2023/0085466 | A1 | 3/2023 | Kumar et al. | |
| 2023/0132878 | A1 | 5/2023 | Perez et al. | |
| 2023/0328323 | A1 | 10/2023 | Jain et al. | |
| 2024/0048786 | A1 | 2/2024 | Jones et al. | |
| 2024/0187667 | A1 | 6/2024 | Docherty et al. | |
| 2024/0187668 | A1 | 6/2024 | Docherty et al. | |
| 2024/0187670 | A1 | 6/2024 | Docherty et al. | |
| 2024/0187671 | A1 | 6/2024 | Docherty et al. | |
| 2024/0187672 | A1 | 6/2024 | Docherty et al. | |
| 2024/0187692 | A1 | 6/2024 | Docherty et al. | |
| 2024/0187693 | A1 | 6/2024 | Docherty et al. | |
| 2024/0187694 | A1 | 6/2024 | Docherty et al. | |
| 2024/0397154 | A1 | 11/2024 | Bloch et al. | |
| 2025/0267324 | A1 | 8/2025 | Docherty et al. | |

FOREIGN PATENT DOCUMENTS

| | | |
|---|---|---|
| EP | 2688264 | 1/2014 |
| GB | 2574581 | 12/2019 |
| WO | 0115449 | 3/2001 |
| WO | 0227526 | 4/2002 |
| WO | 2008042242 | 4/2008 |
| WO | 2013130834 | 9/2013 |
| WO | 2013186061 | 12/2013 |

OTHER PUBLICATIONS

USPTO; Non-Final Office Action dated May 21, 2024 in U.S. Appl. No. 18/130,833.

USPTO; Non-Final Office Action dated May 17, 2024 in U.S. Appl. No. 18/130,850.

(56) References Cited

OTHER PUBLICATIONS

USPTO; Final Office Action dated Jul. 5, 2024 in U.S. Appl. No. 18/130,857.
USPTO; Non-Final Office Action dated Jun. 20, 2024 in U.S. Appl. No. 18/130,866.
Hyvönen et al., "Application of Ontology Techniques to View-Based Semantic Search and Browsing". In: Bussler, C. J., Davies, J., Fensel, D., Studer, R. (eds) The Semantic Web: Research and Applications. ESWS 2004. Lecture Notes in Computer Science, vol. 3053. Springer, Berlin, Heidelberg. https://doi.org/10.1007/978-3-540-25956-5_7, pp. 92-106.
USPTO; Non-Final Office Action dated Aug. 2, 2024 in U.S. Appl. No. 18/130,822.
USPTO; Non-Final Office Action dated Aug. 22, 2024 in U.S. Appl. No. 18/130,853.
USPTO; Final Office Action dated Sep. 6, 2024 in U.S. Appl. No. 18/130,833.
USPTO; Non-Final Office Action dated Feb. 14, 2024 in U.S. Appl. No. 18/130,857.
USPTO; Advisory Action dated Nov. 13, 2024 in U.S. Appl. No. 18/130,833.
USPTO; Non-Final Office Action dated Dec. 6, 2024 in U.S. Appl. No. 18/130,868.
USPTO; Final Office Action dated Jan. 10, 2025 in U.S. Appl. No. 18/130,868.
USPTO; Final Office Action dated Jan. 27, 2025 in U.S. Appl. No. 18/130,815.
USPTO; Final Office Action dated Jan. 29, 2025 in U.S. Appl. No. 18/130,822.
USPTO; Non-Final Office Action dated Jan. 23, 2025 in U.S. Appl. No. 18/130,833.
USPTO; Non-Final Office Action dated Jan. 31, 2025 in U.S. Appl. No. 18/130,857.
USPTO; Final Office Action dated Jan. 28, 2025 in U.S. Appl. No. 18/130,866.
USPTO; Non-Final Office Action dated Feb. 5, 2025 in U.S. Appl. No. 18/130,850.
USPTO; Non-Final Office Action dated Sep. 29, 2024 in U.S. Appl. No. 18/130,815.
USPTO; Final Office Action dated Sep. 30, 2024 in U.S. Appl. No. 18/130,850.
USPTO; Advisory Action dated Oct. 23, 2024 in U.S. Appl. No. 18/130,833.
USPTO; Notice of Allowance dated May 28, 2025 in U.S. Appl. No. 18/130,866.
USPTO; Corrected Notice of Allowance dated Jun. 6, 2025 in U.S. Appl. No. 18/130,866.
USPTO; Non-Final Office Action dated May 27, 2025 in U.S. Appl. No. 18/130,815.
USPTO; Advisory Action dated Jun. 12, 2025 in U.S. Appl. No. 18/130,857.
USPTO; Notice of Allowance dated Feb. 28, 2025 in U.S. Appl. No. 18/130,868.
USPTO; Corrected Notice of Allowance dated Mar. 19, 2025 in U.S. Appl. No. 18/130,868.
USPTO; Advisory Action dated Apr. 10, 2025 in U.S. Appl. No. 18/130,866.
USPTO; Advisory Action dated Apr. 11, 2025 in U.S. Appl. No. 18/130,822.
USPTO; Advisory Action dated Apr. 15, 2025 in U.S. Appl. No. 18/130,815.
USPTO; Notice of Allowance dated May 1, 2025 in U.S. Appl. No. 18/130,853.
USPTO; Final Office Action dated Apr. 24, 2025 in U.S. Appl. No. 18/130,857.
USPTO; Final Office Action dated May 7, 2025 in U.S. Appl. No. 18/130,833.
USPTO; Non-Final Office Action dated May 13, 2025 in U.S. Appl. No. 18/130,822.
USPTO; Final Office Action dated May 14, 2025 in U.S. Appl. No. 18/130,850.
USPTO; Advisory Action dated Jul. 2, 2025 in U.S. Appl. No. 18/130,833.
USPTO; Notice of Allowance dated Oct. 10, 2025 in U.S. Appl. No. 18/130,857.
USPTO; Non-Final Office Action dated Sep. 17, 2025 in U.S. Appl. No. 18/130,850.
USPTO; Advisory Action dated Jul. 16, 2025 in U.S. Appl. No. 18/130,850.
USPTO; Non-Final Office Action dated Aug. 12, 2025 in U.S. Appl. No. 18/130,833.
USPTO; Final Office Action dated Oct. 29, 2025 in U.S. Appl. No. 18/130,822.
USPTO; Non-Final Office Action dated Dec. 18, 2025 in U.S. Appl. No. 18/130,864.
USPTO; Final Office Action dated Jan. 27, 2026 in U.S. Appl. No. 18/130,833.
USPTO; Notice of Allowance dated Mar. 11, 2026 in U.S. Appl. No. 18/130,850.
USPTO; Notice of Allowance dated Mar. 10, 2026 in U.S. Appl. No. 18/130,822.
USPTO; Final Office Action dated Feb. 24, 2026 in U.S. Appl. No. 18/130,864.

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Fig. 2

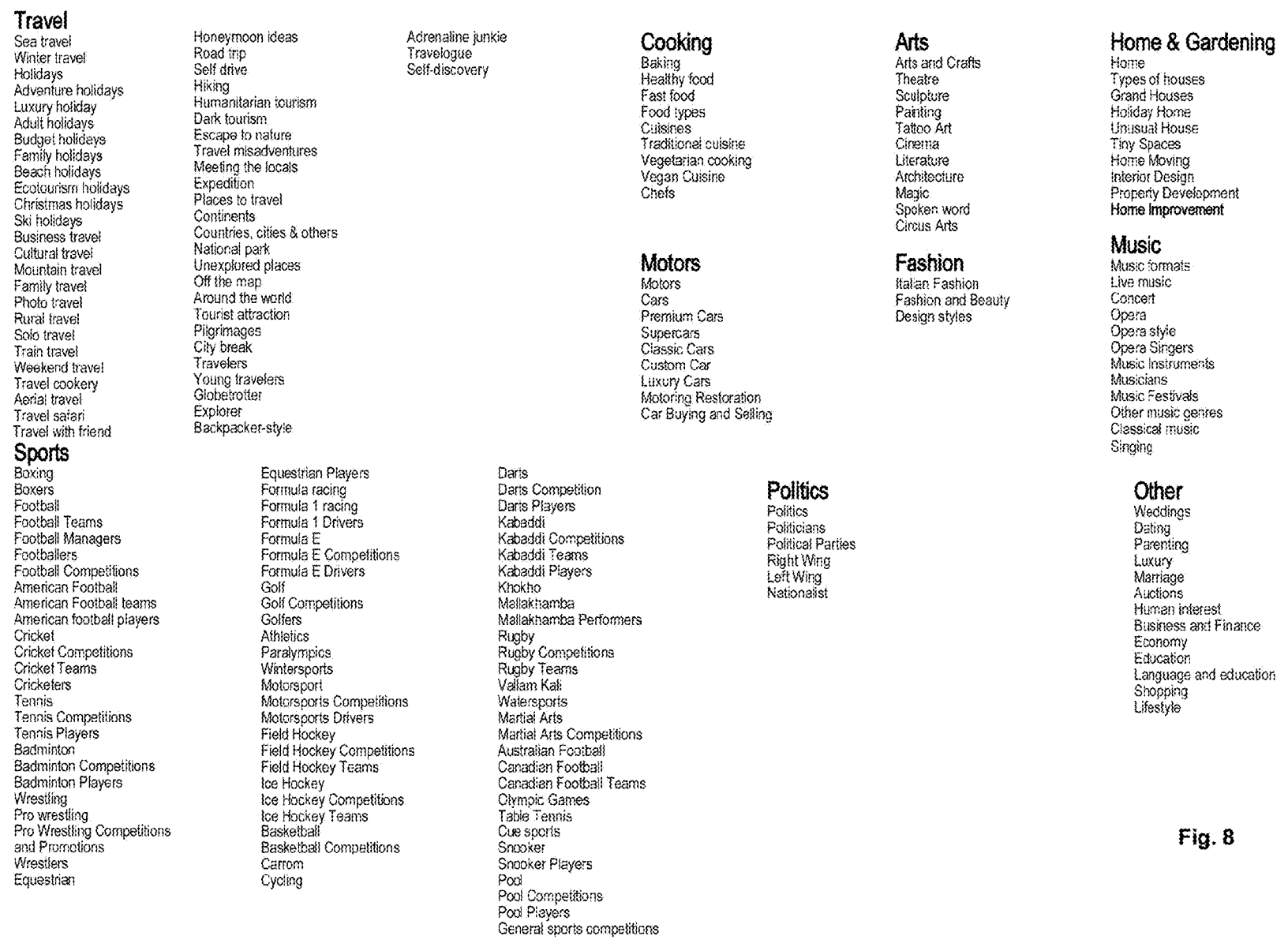

Travel
Sea travel
Winter travel
Holidays
Adventure holidays
Luxury holiday
Adult holidays
Budget holidays
Family holidays
Beach holidays
Ecotourism holidays
Christmas holidays
Ski holidays
Business travel
Cultural travel
Mountain travel
Family travel
Photo travel
Rural travel
Solo travel
Train travel
Weekend travel
Travel cookery
Aerial travel
Travel safari
Travel with friend
Honeymoon ideas
Road trip
Self drive
Hiking
Humanitarian tourism
Dark tourism
Escape to nature
Travel misadventures
Meeting the locals
Expedition
Places to travel
Continents
Countries, cities & others
National park
Unexplored places
Off the map
Around the world
Tourist attraction
Pilgrimages
City break
Travelers
Young travelers
Globetrotter
Explorer
Backpacker-style
Adrenaline junkie
Travelogue
Self-discovery

Sports
Boxing
Boxers
Football
Football Teams
Football Managers
Footballers
Football Competitions
American Football
American Football teams
American football players
Cricket
Cricket Competitions
Cricket Teams
Cricketers
Tennis
Tennis Competitions
Tennis Players
Badminton
Badminton Competitions
Badminton Players
Wrestling
Pro wrestling
Pro Wrestling Competitions and Promotions
Wrestlers
Equestrian
Equestrian Players
Formula racing
Formula 1 racing
Formula 1 Drivers
Formula E
Formula E Competitions
Formula E Drivers
Golf
Golf Competitions
Golfers
Athletics
Paralympics
Wintersports
Motorsport
Motorsports Competitions
Motorsports Drivers
Field Hockey
Field Hockey Competitions
Field Hockey Teams
Ice Hockey
Ice Hockey Competitions
Ice Hockey Teams
Basketball
Basketball Competitions
Carrom
Cycling
Darts
Darts Competition
Darts Players
Kabaddi
Kabaddi Competitions
Kabaddi Teams
Kabaddi Players
Khokho
Mallakhamba
Mallakhamba Performers
Rugby
Rugby Competitions
Rugby Teams
Vallam Kali
Watersports
Martial Arts
Martial Arts Competitions
Australian Football
Canadian Football
Canadian Football Teams
Olympic Games
Table Tennis
Cue sports
Snooker
Snooker Players
Pool
Pool Competitions
Pool Players
General sports competitions

Cooking
Baking
Healthy food
Fast food
Food types
Cuisines
Traditional cuisine
Vegetarian cooking
Vegan Cuisine
Chefs

Motors
Motors
Cars
Premium Cars
Supercars
Classic Cars
Custom Car
Luxury Cars
Motoring Restoration
Car Buying and Selling

Politics
Politics
Politicians
Political Parties
Right Wing
Left Wing
Nationalist

Arts
Arts and Crafts
Theatre
Sculpture
Painting
Tattoo Art
Cinema
Literature
Architecture
Magic
Spoken word
Circus Arts

Fashion
Italian Fashion
Fashion and Beauty
Design styles

Home & Gardening
Home
Types of houses
Grand Houses
Holiday Home
Unusual House
Tiny Spaces
Home Moving
Interior Design
Property Development
Home Improvement

Music
Music formats
Live music
Concert
Opera
Opera style
Opera Singers
Music Instruments
Musicians
Music Festivals
Other music genres
Classical music
Singing

Other
Weddings
Dating
Parenting
Luxury
Marriage
Auctions
Human interest
Business and Finance
Economy
Education
Language and education
Shopping
Lifestyle

Fig. 8

| **Potential Intention Segments** |
|---|
| Arts & Crafts |
| Baby & Children |
| Beauty & Personal care |
| Business & industrial |
| Business Services |
| Cars & Vehicles |
| Clothing & Accessories |
| Computers & Peripherals |
| Consumer Electronics |
| Education |
| Employment |
| Event Tickets |
| Finance |
| Food |
| Gifts & Occasions |
| Home & Garden |
| Media & Entertainment |
| Musical Instruments and Accessories |
| Software |
| Sports & Fitness |
| Telecom |
| Travel |

Fig.19

Monitoring user activity including identifying content selected for viewing by the user of the user device Obtaining metadata concerning the selected items of content Generating or updating a user record for the user Processing the user record to generate an affinity profile, the affinity profile comprising at least one selected affinity category or affinity category score

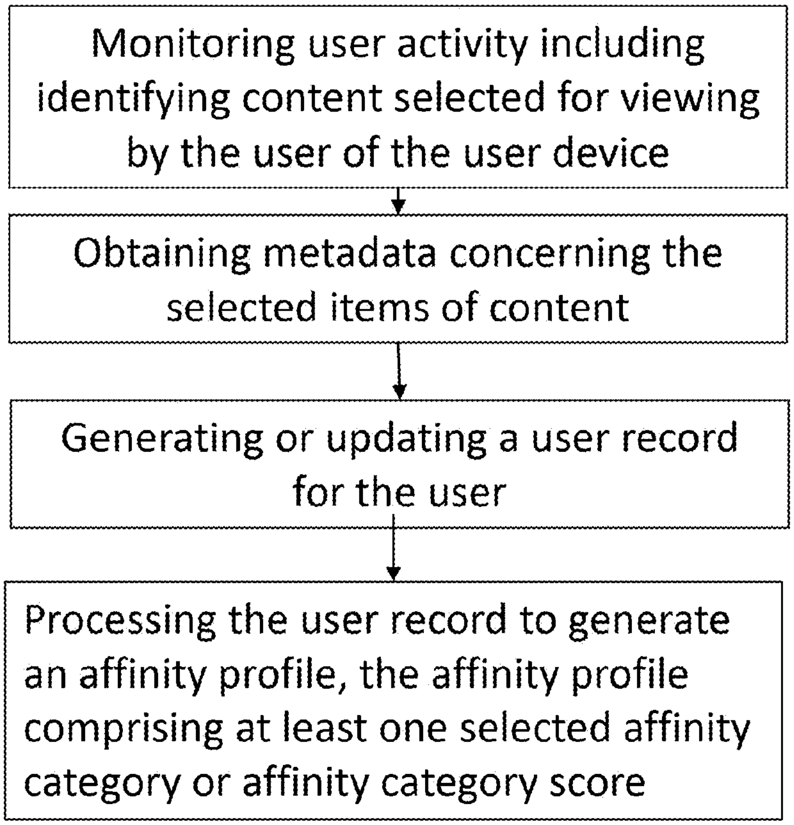

Fig. 23

Generating or otherwise obtaining an affinity profile for a user based a user record that represents television or other content selection and/or viewing by the user using at least one user device Determining an intention to perform an action based on an affinity profile of the user or a change in affinity profile of the user

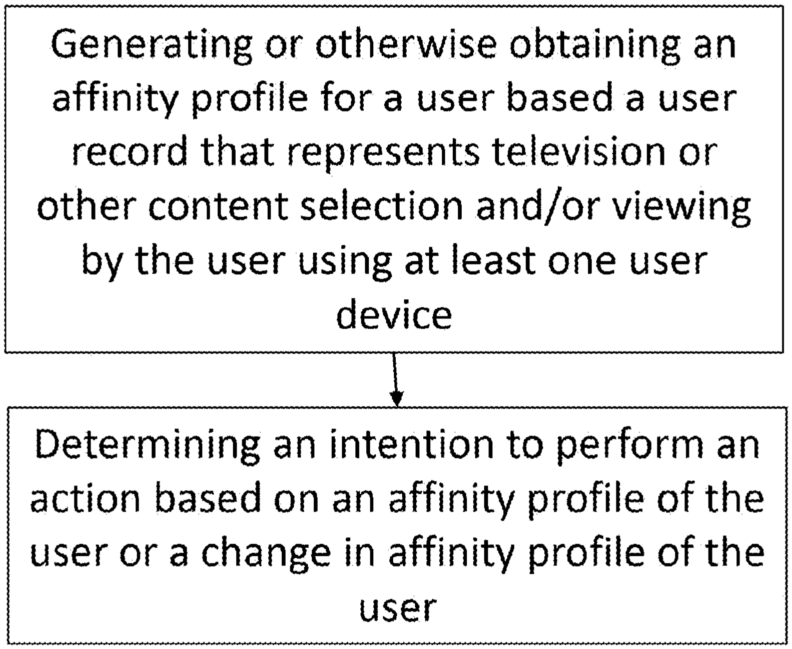

Fig. 24

Determining an affinity profile for a user account based on a user record that represents television or other content selection and/or viewing by the user account Determining household composition based on the affinity profile for the user account

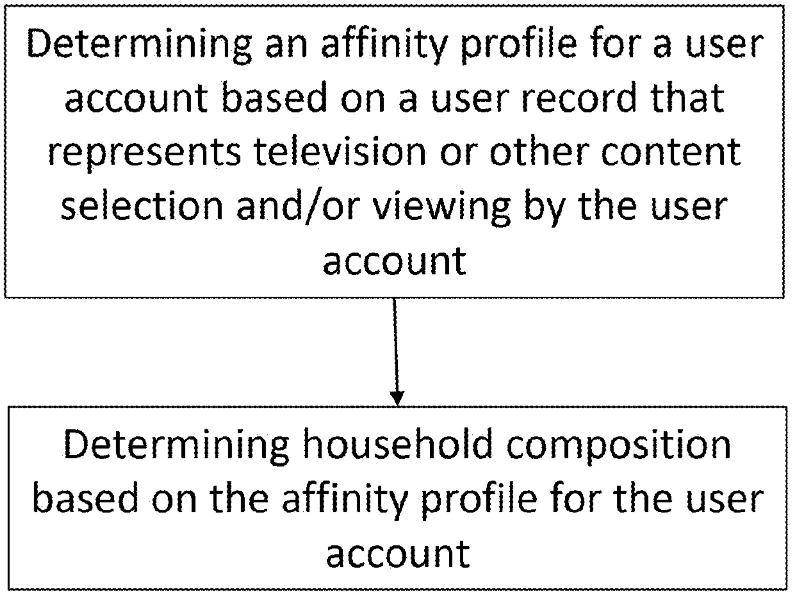

Fig. 25

Obtaining affinity profiles for a plurality of users of a content distribution system, wherein each affinity profile comprises at least one selected affinity category or affinity category score Determine an audience that is expected to consume a selected item of content based on the affinity profiles of the users

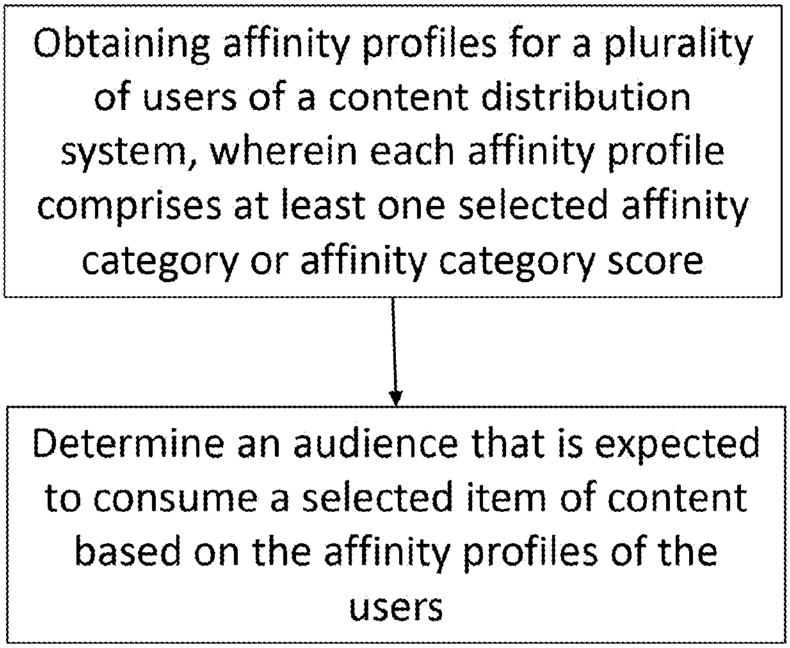

Fig. 26

Determining an affinity profile for a user account based on a user record that represents television or other content selection and/or viewing by the user account Monitoring consumption of selected items of content of a selected type Determine an audience that is expected to consume items of content of selected type based on the affinity profiles of the users

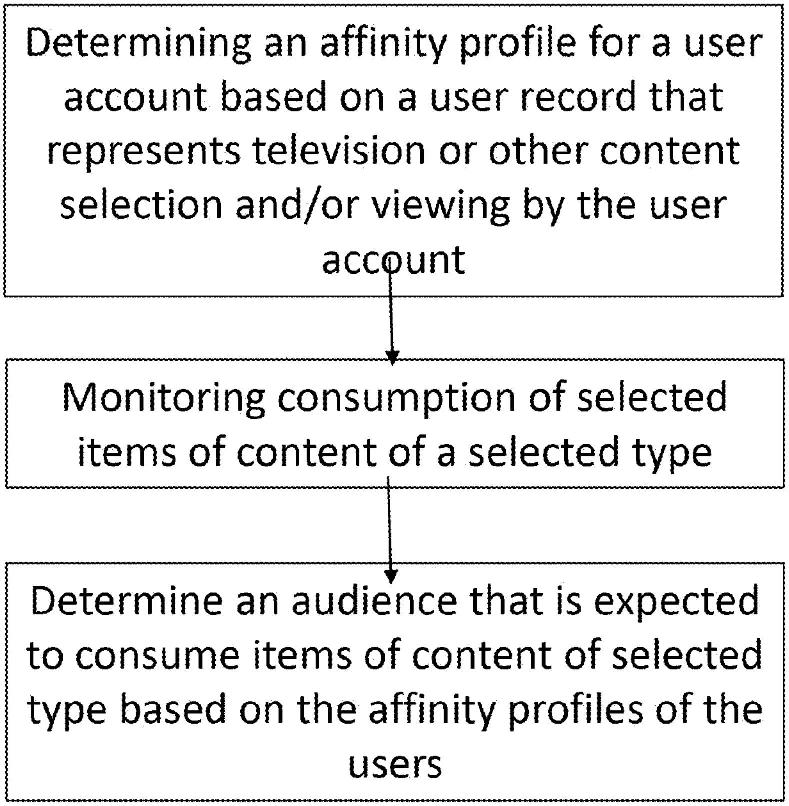

Fig. 27

Obtaining affinity profiles for a plurality of users of a content distribution system, wherein each affinity profile comprises at least one selected affinity category or affinity category score Determine a likelihood of, or an expected audience measure for, a selected time period based on the affinity profiles and monitored consumption of content or other activity

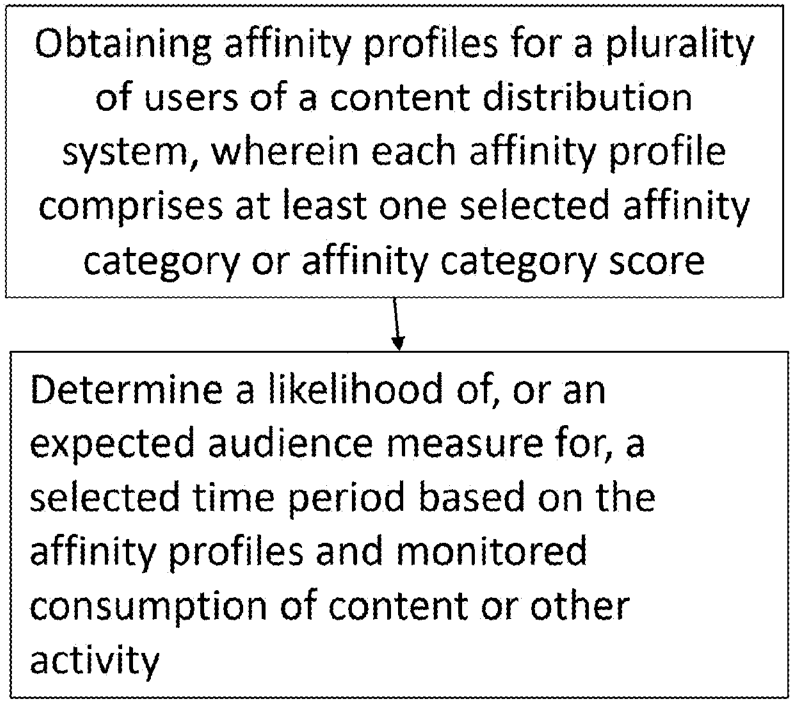

Fig. 28

Determining an affinity profile for users based on user records that represent television or other content selection and/or viewing by the users Categorizing each user into one or more of a plurality of user segments based on their affinity profile.

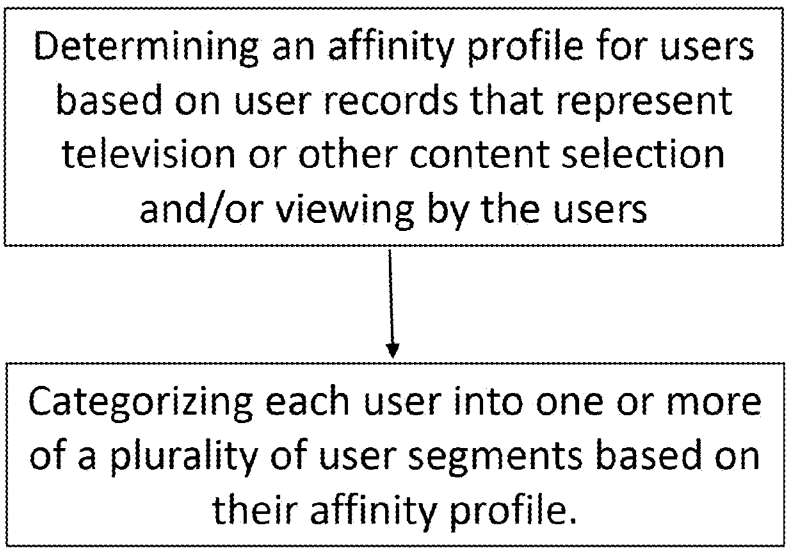

Fig. 29

For each of a plurality of users of a content distribution system, monitoring user activity including identifying content selected for viewing by the users Obtaining metadata concerning the selected items of content, the metadata representing at least some properties of the selected items of content;

Generating or updating a user record for each user identifying users that have below a threshold level of user activity

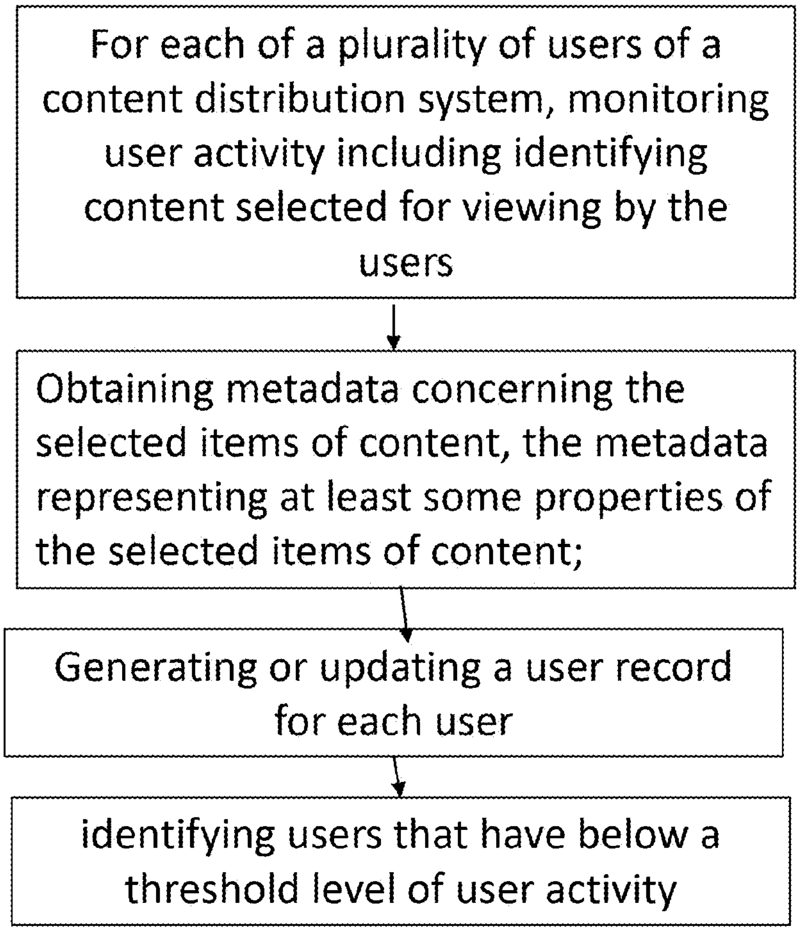

Fig. 30

AFFINITY PROFILE SYSTEM AND METHOD

CROSS-REFERENCE TO RELATED APPLICATIONS

This application claims priority to and the benefits of GB Application No. 2218177.0, filed on Dec. 2, 2022, which is hereby incorporated by reference in its entirety for all purposes

FIELD OF INVENTION

The present invention relates to a system and method for determining affinity profiles of users, for example users of television system. The invention also relates to the distribution of selected content, for example via a television system, to users based on such affinity profiles.

BACKGROUND OF THE INVENTION

Developments in technology mean that users are able to access content via a wide array of different mechanisms, and via a wide array of different sources. For example, television channels, radio stations, video-on-demand and other streaming services, social media and other internet content sources provide a vast array of content available to a user.

In TV systems, or other systems for provision of content to a user, each service provider may have thousand, tens or hundreds of thousands, or millions of customers, wherein each customer is unique and may have different viewing habits and preferences.

Tracking, recording and processing large volumes of customer data together with large amounts of content data within reasonable time constraints and with acceptable accuracy poses a significant technical challenge. The time constraints demanded by particular content providers, or expected by users, may be particularly demanding. This can present a significant technical challenge, particularly as the system is usually hosted on one or more servers remote from the set top box or other device and, for systems with millions of subscribers, may have to deal simultaneously with hundreds of thousands of user actions or interactions per minute during busy periods.

Any improvement in understanding of user preferences or behaviour can be useful, for example, in resource management and/or operation of a content distribution system, as it can be potentially be used in predicting for example content consumption, use of the content distribution system and other actions by users, which can assist in managing system resources, for example memory or bandwidth resources or other resources.

It is desirable to target users with different content, or to make particular content available to particular users. For example, accurate targeting of advertising or other content to the most appropriate group of users in the most appropriate manner is of great importance and underpins many business models in the current content distribution landscape.

However, the diversity of different content sources and mechanisms, and the array of different content distribution platforms, can present significant technical and other problems in accurately determining information about a user and their content consumption and underlying attributes.

Considering TV advertising issues in particular, advertisers desire better targeting of TV audiences. It may be desirable for a TV operator to package its unique and advantageous first party consumer data to offer advertisers valuable target audiences that they recognise, value and can measure. This can make a TV operator's platform more attractive to advertisers, creating richer attributes that enable higher premiums and increasing revenues. Determination of more sophisticated user affinity attributes may also offer opportunities for niche (new-to-TV) advertisers to move into TV.

Various significant issues with the modern advertising ecosystem are known. For example, in relation to targeting accuracy and effectiveness, many advertisers wish to be able to use TV to target their digital audiences on TV across platforms to expand reach. Digital content distribution systems have established the usefulness of the affinity attribute, and the decline in the use of cookies is causing a reconsideration concerning how to target users. First party data is becoming more important and federating such data, for example finding a useful and consistent way of using it, is important. At present many TV advertisers use traditional demographic data (e.g. ABC1 categories etc).

Cross-platform consistency is another significant issue. Advertisers may want to access audiences across all platforms to get maximum reach. Many advertisers wish to access the same audience across all platforms. This requires that the definitions of audiences be consistent across media platforms, which is far from the case today.

A further issue arises from measurement, for example how an advertiser can be sure that the advertisement they have spent money on is being seen by the right consumer at the right time in the right media?

TV Operators are facing several challenges to future income streams. Consumer research suggests that monthly subscription pricing will become highly elastic once it reaches modest (by traditional cable pricing) monthly amounts, leading to high churn. In addition, competition for consumer TV subscriptions is increasing. Most SVOD operators are considering introducing some form of advertising on their platforms to maintain revenue growth and AVOD players are having to become more sophisticated in targeting to match the video offerings of the digital giants.

Addressable advertising offers operators the means for advertising deployment that has better consumer relevancy and personalisation and, therefore, a better viewer experience.

The business case for addressable advertising on TV depends on an operator being able to identify and target highly specific consumer audiences that are valuable, consistent, and compelling to advertisers.

A key enabler is an operator's unique 1st party consumer data. However, the majority of existing operator targeting offers use geographical and generic 3rd party attributes. Whilst this is a step forward from the old TV demographics, it is significantly behind both digital targeting offerings and the powerful propensity-based targeting capabilities used by those organisations with significant quantities of their own customer data. The represents an important gap in market provision.

One potential answer is to deploy data, analytical and data science skills to investigate and model viewing data. Some operators have tried or are trying this. However, producing meaningful, predictive and (hence) valuable targeting attributes from 1st party data can be slow, expensive, and uncertain for an operator using manual analytical resources and techniques.

The addressable TV ecosystem is large and complex with many vendors and powerful incumbents. However, the capability of audience targeting is very underserved. In some digital, for example internet, environments, companies can more easily collect behavioural data and create affinity segments. In TV and OTT it is much more difficult. Collecting raw viewing data and transforming it into meaningful viewing records is challenging and modelling those viewing records to create and operationally manage affinity targeting attributes is even more difficult.

In digital media, the ease of collecting huge volumes of consumer behavioural data has enabled quite sophisticated targeting and decision-making capabilities and a completely new way of trading and deploying advertising—programmatic—which aims to find and serve an advertisement to the chosen audience target, whatever the property or device.

Targeting on TV is, by comparison, antiquated. Most TV advertising is still bought and sold using very crude demographic segments. As operators have moved into addressable advertising, most have initially sought to sell ad inventory using geo-targeting and later by matching subscribers to purchased third party lifestyle data to offer advertisers 'off the shelf' targeting attributes. However, this does not address advertisers' demands for consistent digital-TV audience taxonomies (e.g. for cross-platform campaigns) or accuracy (e.g. based on consumer behaviour).

The capability for an operator to automate the generation of powerful audience attributes that reflect the behaviours of its audience and hence offer differentiation and value to advertisers is therefore much needed. If such capability could be implemented quickly and easily, then this would be even more desirable, given the technical challenges that pertain in this technical environment.

SUMMARY

In a first aspect there is provided a computer-implemented method of using affinity profiles to determine at least one audience category that is expected to consume a selected item of content at one or more selected time periods, the method comprising:

- obtaining affinity profiles for a plurality of users of a content distribution system, wherein each affinity profile comprises at least one selected affinity category or affinity category score, and the affinity categories are selected from a stored set of affinity categories, each representing a user's affinity for a respective subject area;
- monitoring consumption of items of content or other activity of the users for different time periods;
- determine the likelihood of, or an expected audience measure for, the selected item of content being consumed during the or each selected time period based on the affinity profiles and the monitored consumption of content or other activity for the different time periods.

The method may be performed in conjunction with a method of providing television content or other content to each of the plurality of users using a content distribution system. Each user device may display an electronic programme guide (EPG) or other user interface that is operable by a user to select one or more items of television or other content. In response to the selections the distribution system may distribute the selected items of television content or other content to the user devices for viewing or other consumption by the users during content viewing sessions.

The user interface may be operable by a user to select one or more items of content of content types other than television content,

- the obtaining of metadata, the generating or updating of the user record, and the processing of the user record to generate the affinity profile may be performed using the content metadata obtained for both selected items of television content and selected items of content of the other content types, and
- the other content types may comprise at least one of computer games, books, music, spoken word content, other audio content, newspapers, or magazines.

The method may comprise:

- for each of a plurality of user devices, monitoring user activity including identifying content selected for viewing by the users of the user devices;
- obtaining metadata concerning the selected items of content, the metadata representing at least some properties of the selected items of content;
- generating or updating user records for the users, the user records comprising or representing the user activity and/or the associated content metadata;
- processing the user records to generate the affinity profiles for the users based on the user records.

The method may comprise categorizing each user into one or more of a plurality of user segments based on their affinity profile. The determining of likelihood of, or the expected audience measure for, the selected item of content being consumed during the or each selected time period may be based on the segments to which the users belong and on the monitored consumption for different time periods.

The monitoring of consumption of items of content or other activity of the users for different time periods may be performed using the user records of the users.

The determining of the likelihood of, or the expected audience measure for, the selected item of content being consumed during the or each selected time period may comprise providing the affinity profiles, user records and/or monitored consumption to a machine learning model that is trained to output a likelihood of, or the expected audience measure for, the selected item of content being consumed.

The method may comprise determining an optimal one or more of the time periods to provide the content.

The optimal one or more of the time periods may comprise the time period(s) which has a maximum expected audience size or a maximum expected audience of users with a desired affinity profile or belonging to desired user segment.

The time periods may be time windows during a day and/or days of the week.

The item of content may be provided to user devices of the users using a content distribution system, wherein each user device displays an electronic programme guide (EPG) or other user interface that is operable by a user to select one or more items of television or other content, and in response to the selections the distribution system may distribute the selected items of television content or other content to the user devices for viewing by the users during content viewing sessions.

The generating of the affinity profiles may comprise applying a machine learning model to the user record, the machine learning model being configured to output the affinity profile based on the user record.

The machine learning model may comprise or uses a text classifier that is operable to receive text input relating to television content, or other content, as part of the user record and to output the affinity profile.

The text classifier may comprise a zero shot classifier.

The generating of the affinity profile may be independent of, or may be performed without taking into account, data representing socio-economic or demographic status of the user.

It may be that the user record for each user does not include any data representing socio-economic or demographic status of the user.

It may be that the user record for each user is anonymous;

It may be that the obtaining of metadata, the generating or updating of user records, and the processing of the user records to generate affinity profiles may be performed by processing circuitry that does not have access to at least one of or all of data representing socio-economic or demographic status of the users or identity of the users.

The stored set of affinity categories may comprise at least 100 affinity categories or sub-categories.

The metadata concerning the selected items of content may be obtained from a stored ontology that includes at least 10,000 features that can be used as meta data to represent items of content.

The ontology may include enriched versions of metadata obtained for items of content.

The processing of the user record to generate an affinity profile may comprise applying a mapping process to map between the metadata in the user record and the affinity categories, the mapping process including applying weightings or confidence scores for mappings between metadata in the user record and items in the affinity categories.

The user record may comprise or represent user activity for different time windows, for example during a day or week, and the method may comprise generating different affinity profiles for the user for the different time windows.

The method may comprise categorizing a user into one of a plurality of categories based on the affinity profile.

The affinity profile for the user may comprise a set of scores, each score being for a respective one of the affinity categories.

The user may be a user account.

A plurality of individuals may have access to the user account and/or a plurality of user devices may be associated with the user account. The affinity profile for the user account may be based on selection of content by the plurality of individuals and/or using the plurality of user devices.

The method may comprise selecting additional television content or other content to push to the user based on the determined affinity profile for the user.

The method may comprise outputting the determined affinity profiles for the plurality of users via an API or operator interface thereby making the affinity profiles available to a third party external to the content distribution system and/or affinity profile system.

In a further aspect, which may be provided independently, there is provided a system comprising processing circuitry configured to:

- obtain affinity profiles for a plurality of users of a content distribution system, wherein each affinity profile comprises at least one selected affinity category or affinity category score, and the affinity categories are selected from a stored set of affinity categories, each representing a user's affinity for a respective subject area;
- monitor consumption of items of content or other activity of the users for different time periods;
- determine the likelihood of, or an expected audience measure for, the selected item of content being consumed during the or each selected time period based on the affinity profiles and the monitored consumption of content or other activity for the different time periods.

In another aspect there is provided a non-transitory computer-readable medium that comprises computer-readable instructions that are executable to perform a method as claimed or described herein.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 2 is representation of certain database learning tables used by the system of FIG. 1;

FIG. 8 shows high-level categories and sub-categories of a set of categories in one embodiment;

FIG. 19 is table of Intention segments according to an embodiment;

FIGS. 23 to 30 are flow charts showing in overview methods that are performed by the system of any of FIGS. 1 to 4 in certain embodiments.

DETAILED DESCRIPTION

As mentioned above, in TV systems, or other systems for provision of content to a user, each service provider may have thousand, tens or hundreds of thousands, or millions of customers, wherein each customer is unique and may have different viewing habits and preferences.

Tracking, recording and processing large volumes of customer data together with large amounts of content data within reasonable time constraints and with acceptable accuracy poses a significant technical challenge. The time constraints demanded by particular content providers, or expected by users, may be particularly demanding. This can present a significant technical challenge, particularly as the system is usually hosted on one or more servers remote from the set top box, smart TV or other device and, for systems with millions of subscribers, may have to deal simultaneously with hundreds of thousands of user actions or interactions per minute during busy periods.

Figure 1:
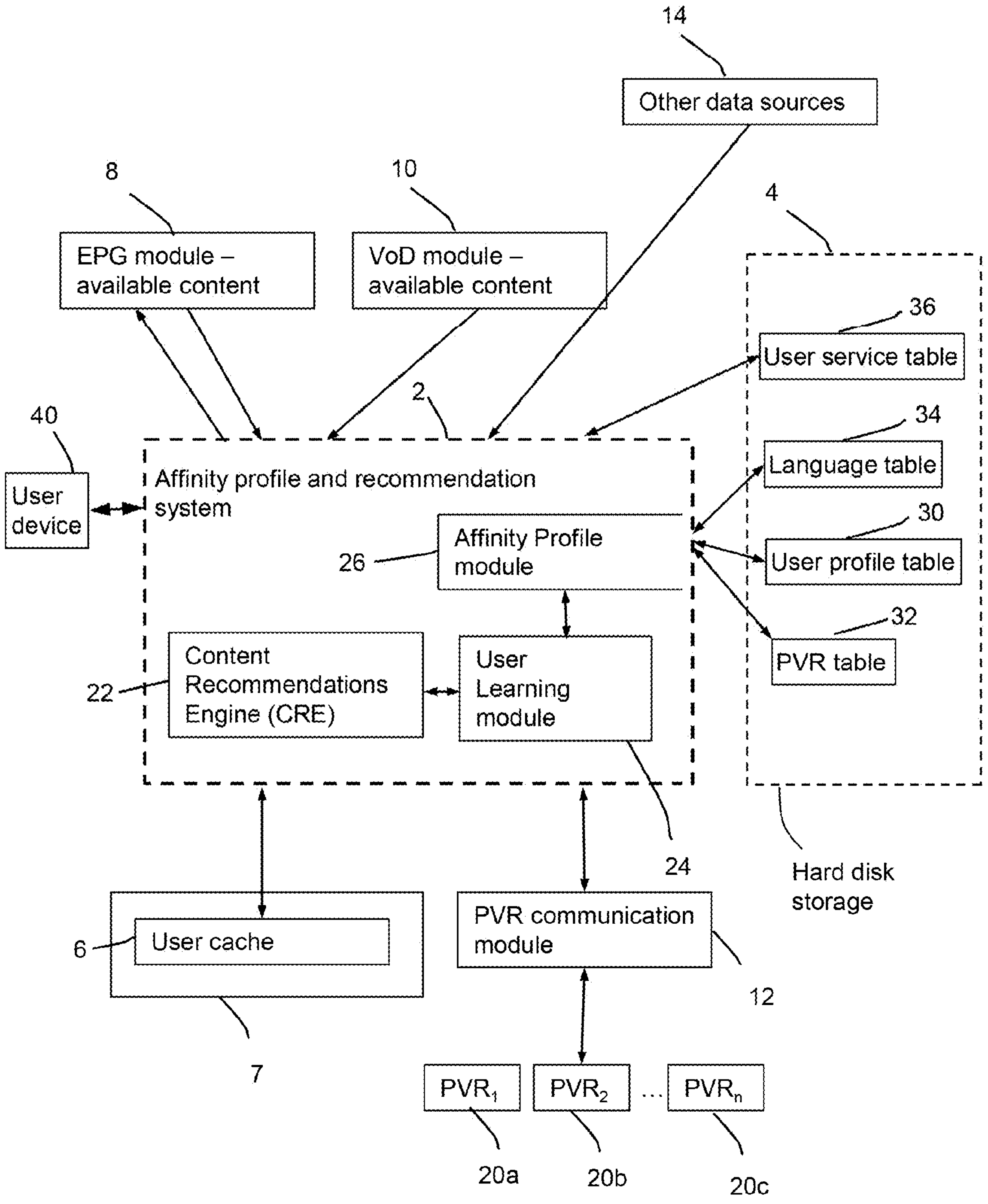
FIG. 1 is a schematic diagram of an affinity profile generation system.

FIG. 1 shows a schematic diagram of an affinity profile generation system according to an embodiment, which is operable to generate affinity profiles for users based on first party data in the form of, for example, user actions performed in relation to their selection, viewing and other actions in relation to TV content provided by a TV distribution system, and/or in relation to other content.

The system in the embodiment of FIG. 1 is also able to provide content recommendations to users as well as generating affinity profiles. Content recommendations may be provided in real time or near real time for many thousands, tens of thousands or even hundreds of thousands or more users, for example using techniques as described in UK Patent No. GB 2574581 or U.S. patent Ser. No. 11/343,573, the content of each of which is incorporated herein by reference.

In alternative embodiments, the affinity profile generation system is provided without also including content recommendation functionality and components. For example, in some variants of the embodiments of FIG. 1 the system architecture is substantially the same, but without the content recommendation engine 22 being present and/or used.

Some example modes of operation are described below in relation to PVRs associated with users, but content may be provided or accessible via any suitable devices, for example set-top boxes, smartphones, PCs or tablets or any other suitable content delivery mechanism.

The system in the embodiment of FIG. 1 comprises an affinity profile and recommendation system 2 that comprises a content recommendation engine (CRE) 22 and an affinity profile module 26 each of which is linked to a first storage resource in the form of a hard disk storage device 4, which is used to store various user data. The affinity profile and recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, the affinity profile and recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The affinity profile and recommendation system 2 and the affinity profile module 26 are also linked to sources of information concerning available content, in this case an EPG module 8 and a Video-on-Demand (VOD) module 10 which provide information concerning content available to a user via an EPG (for example, scheduled TV programmes on a set of channels) and via a VOD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the affinity profile module 26, the VoD module 10, affinity profile and recommendation system 2, the user cache 6, a PVR communication module 12, the EPG module 8 and a user learning module 24 are implemented in a server. The server includes communication circuitry that enables communication between the server, or appropriate components of the server, with each of the user devices, and with the content sources, for example a TV service operator or other content service operator.

Any other suitable implementation of the EPG module 8, the VOD module 10, the affinity profile and recommendation system 2, the affinity profile module 26, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VOD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VOD module 10 may also be enriched with additional metadata, for example by the operator of the system of FIG. 1, such that additional metadata that is additional to that provided by the content sources or other external sources may be stored.

In the embodiment of FIG. 1 the system operates together with three sources of content for a user device: real-time linear television, for example terrestrial or satellite broadcast television; one or more video-on-demand (VOD) services; and pre-recorded video content stored on one or more personal video recorders (PVR). In alternative embodiments further sources of content as well as or instead of those shown may be used.

The operation of the digital content recommendation system is controlled by the affinity profile and recommendation system 2. As can be seen in FIG. 1, the affinity profile and recommendation system 2 is configured to communicate with the one or more content information modules: the electronic programme guide (EPG) module 8 and VOD module 10. The affinity profile and recommendation system 2 is also configured to communicate with the user cache 6 local to the affinity profile and recommendation system 2, the hard disk storage resource 4 and the one or more PVRs. A data access layer provides a communication interface between the affinity profile and recommendation system 2 and the hard disk storage resource 4. A personal video recorder (PVR) communication module 12 provides a communication interface between the one or more PVRs 20*a*, 20*b*, . . . 20*z* and the affinity profile and recommendation system 2.

The affinity profile and recommendation system 2 has a content recommendation engine (CRE) 22, an affinity profile module 26 and a user learning module 24.

As discussed in more detail below, the affinity profile module 26 is operable to use first party data obtained by an operator of the system to determine affinity profiles of individual users, or sets of users, for example an interest of the user(s) in particular subject matter. It has been found that the use of such first party data can be used to provide accurate assessment of interests of a user across a large number of categories, providing sophisticated affinity profiling of such users. As will be discussed further below, such affinity profiles can vary over time and monitoring variation over time can provide for sensitive assessment of which users may be likely to engage with a particular piece of content, for example a piece of advertising content or other pushed content. User data or other first party data can also be used to assess when, for example during which time of the day, week, month or year, a particular user may be most likely to engage with a particular piece of content, for example based on time-variation or changes in affinity profiles. Such processes are discussed in more detail below.

The CRE 22 can apply a set of processes to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalised recommendations and/or an affinity profile for the user.

In addition to receiving requests for recommendation, the affinity profile and recommendation system 2 is configured to log user activity. By logging user activity and storing activity over an extended period of time, the affinity profile and recommendation system 2 and the hard disk storage 4 can build up an overall picture of the viewing activities, habits and preferences of a plurality of users. User actions are turned into learn actions by the user learning module 24 to be processed by the affinity profile module 26 and the content recommendation engine 22.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user cache 6 is coupled to the affinity profile module 26 and the content recommendations engine 22, and data stored by the user cache 6 may be used by the affinity profile module 26 and the content recommendations engine 22. The affinity profile and recommendation system 2 can access data stored on the user cache 6. The user cache 6 may be provided in random access memory (RAM) 7.

The hard disk storage 4 is communicatively coupled to the affinity profile and recommendation system 2. The hard disk storage 4 stores data for use by the affinity profile and recommendation system 2. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the affinity profile module 26 to generate and update affinity profiles for users, and by the CRE 22 to generate content recommendations. In the embodiment of FIG. 1 a set of database tables is provided that store information concerning the users.

Figure 3:
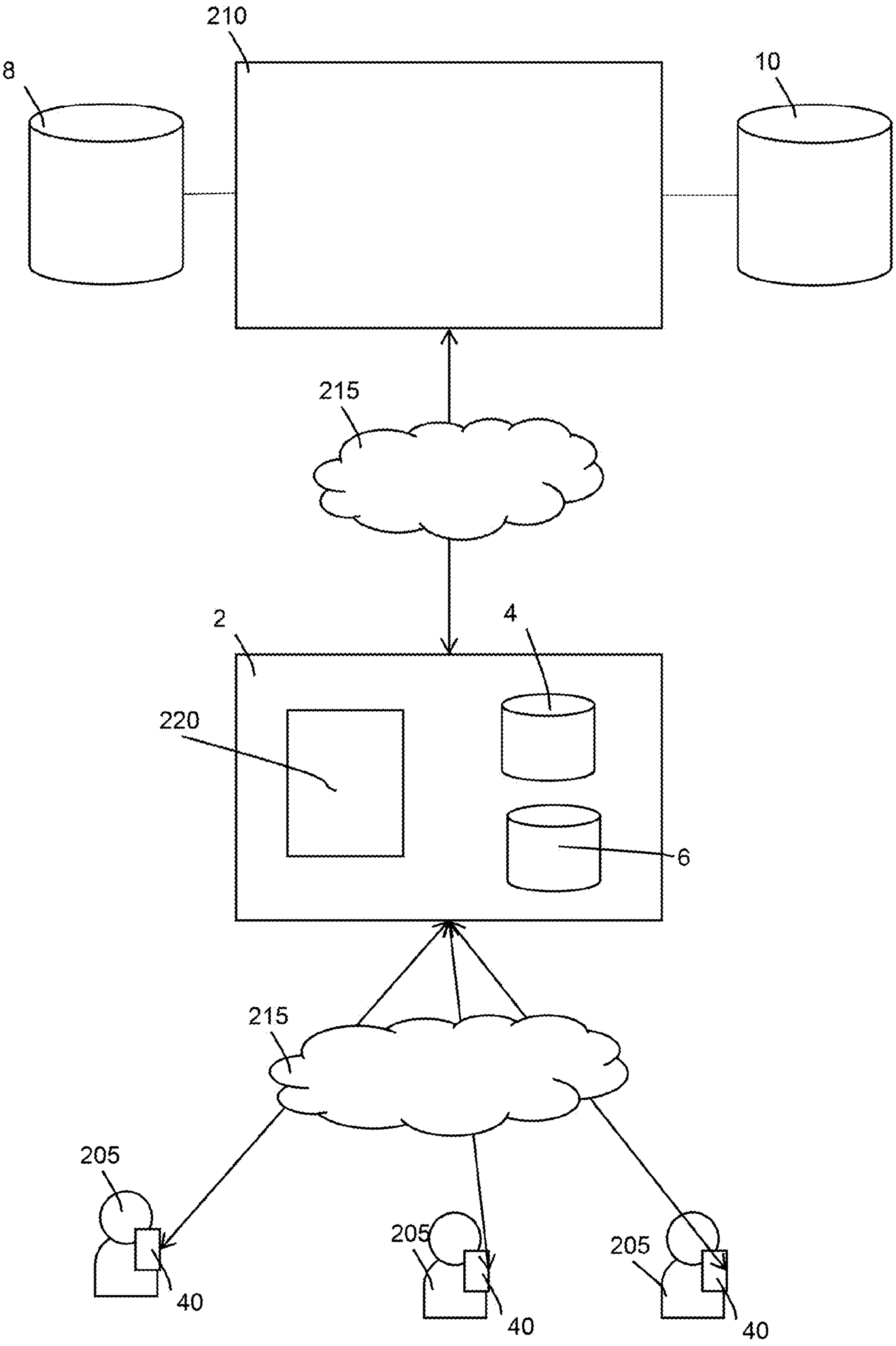
FIG. 3 is a schematic of an alternative system arrangement.

In the embodiment of FIG. 1, the tables may include at least one user service table 36 that represent user service requirements, and at least one user profile table 30 that includes user attribute data that may be considered to represent a user profile. In the example of FIG. 3, a language table 34 and a PVR table 32 are also provided, and any suitable tables or combinations of tables can be provided in other embodiments. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user. In some embodiments it is an important feature that users remain anonymous to the affinity profile and recommendation system, and the content of user records or user profiles can be set accordingly, for example data representing any personal or other information that could be used to identify a user may be not included in such embodiments.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1 it can be understood that a large part of the user data comprises user history or user action data that represent user actions over a significant period of time.

In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations and/or affinity profiles. In that case, the content recommendations may be based on attributes and/or user actions for a plurality of individuals associated with the same subscription, for example different members of the same household. The second is time-slot mode where content recommendations affinity profiles are generated in dependence on the particular time slot in question. For example user data generated for a particular time slot may be used selectively in generating affinity profiles or content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer or subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the affinity profile and recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: PV1, PV2, . . . , PVn. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of PVR1 and user of PVR2 may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20*a*, 20*b*, . . . 20*z* and the affinity profile and recommendation system 2. As described later, with reference to FIGS. 6A, 6B, 7A and 7B, the affinity profile and recommendation system 2 collects identifying information relating to the content items stored on the PVRs 20*a*, 20*b*, . . . 20*z*. Content items from the PVR of the user can then be taken into consideration in generating affinity profiles and content recommendations.

In alternative embodiments any other data stores, for instance local storage devices, for example any storage devices included in or associated with user devices, may be used as well as or instead of PVRs. In some embodiments the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as corresponding to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

Although a particular system arrangement is shown in FIG. 1, there are various system arrangements that could be used.

FIG. 3 shows a "middleware" arrangement in which the affinity profile and recommendation system 2 sits as "middleware" between users 205 and systems of a content provider 210. The affinity profile and recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the affinity profile and recommendation system 2 receive data sent from the user devices 40 of the users 205 that represents the user actions/user activity taken by the user 205. The user devices 40 also provide a user ID that can be used to identify the user 205 to allow the provision of a content selection interface that is customized for that user 205. The user devices 40 communicate the data over a network, such as the cloud 215, to the recommendation system 2. The affinity profile and recommendation system 2 records the user actions in order to generate learn actions and build and update a user profile. The affinity profile and recommendation system 2 can communicate the requests and other data from the user devices 40 to the content providers systems 210 in order to provide the content to the user devices 40.

Figure 4:
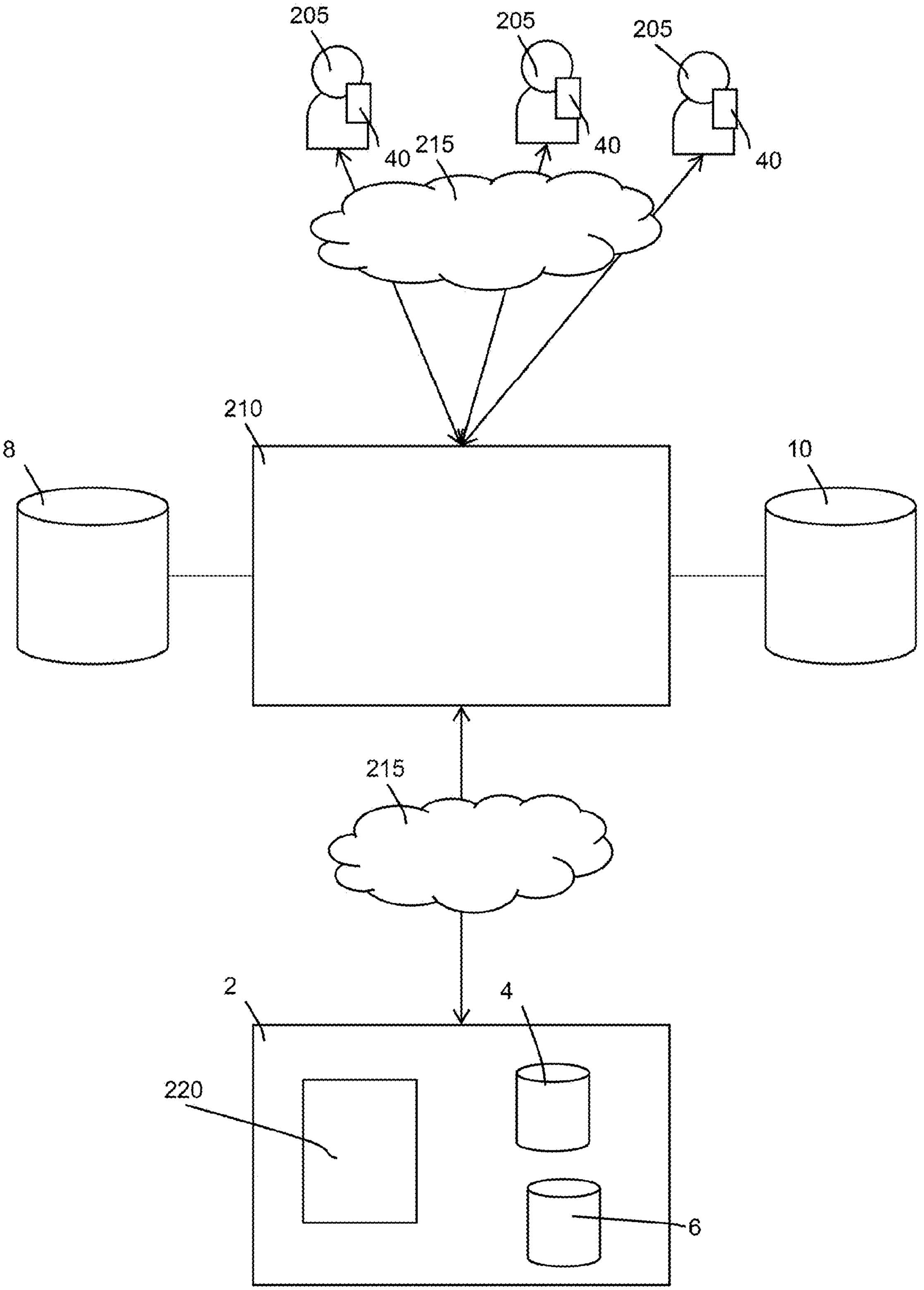
FIG. 4 is a schematic of a further alternative system arrangement.

Other system arrangements that provide similar functionality are possible. FIG. 4 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the affinity profile and recommendation system 2 in order for the affinity profile and recommendation system 2 to identify learn actions and build user profiles.

Figure 5:
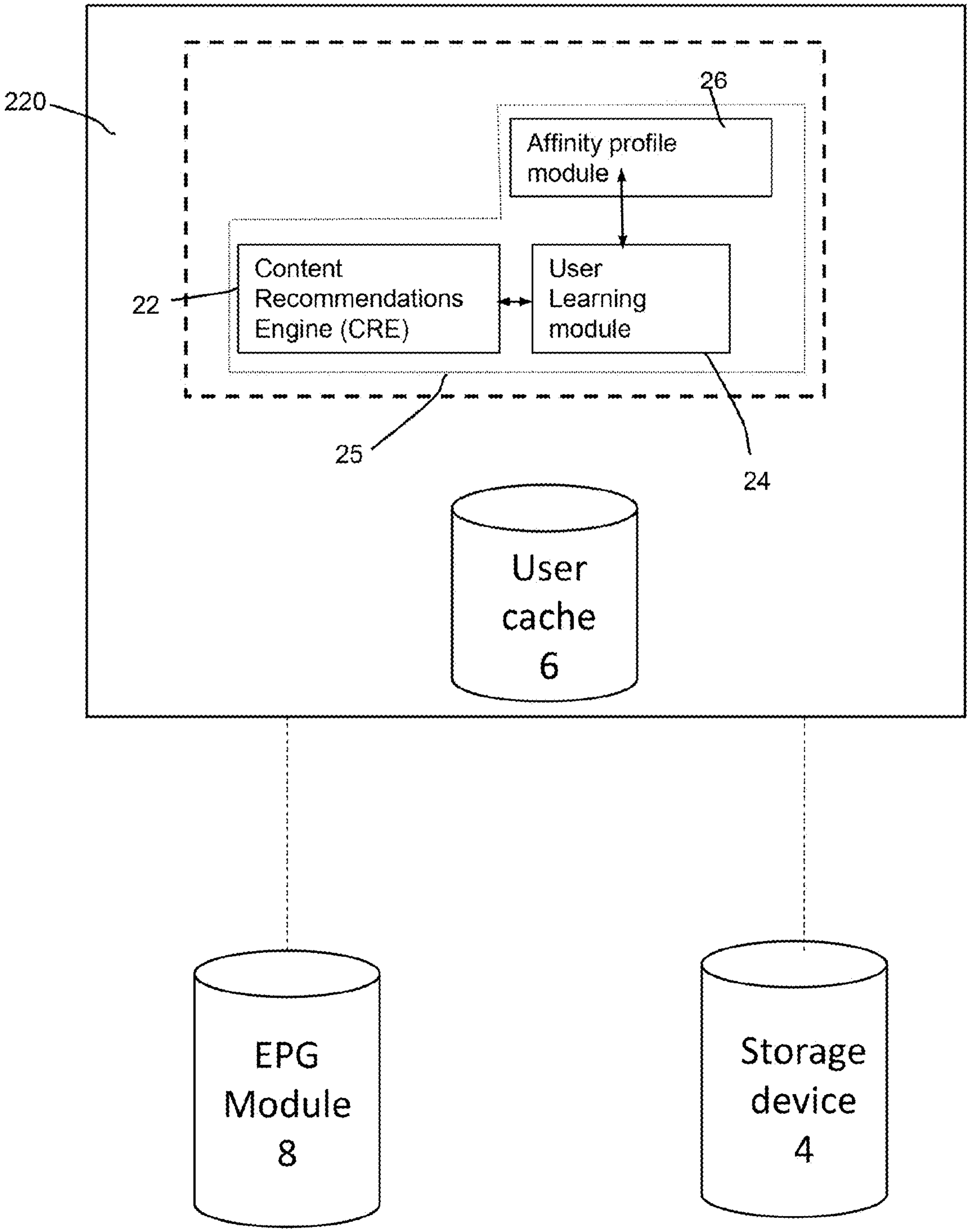
FIG. 5 is a schematic of another alternative system arrangement.

FIG. 5 shows an arrangement of processing resource 220 for implementing the affinity profile and recommendation system 2, including the CRE 22, the user learning module 24 and the affinity profile module 26. The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the user cache 6 when needed by the processing resource 220.

It is a features of some embodiments that the affinity profile and recommendation system 2 and/or the content provider 210 may be configured such as to restrict or not allow access to personal information, or data that could be used to determine the name of a user, or demographic information concerning the user, by the affinity profile and recommendation system 2, even if such information or data is stored at, or accessible to, the content provider 210. Thus, user anonymity may be preserved at the affinity profile and recommendation system 2. As discussed further it is a feature of certain embodiments for affinity profiles to be generated based on user actions even without access to such demographic information or personal information concerning the user.

As mentioned above, the affinity profile module 26 is operable to use first party data obtained by an operator of the system to determine affinity profiles of individual users, or sets of users, for example an interest of the user(s) in particular subject matter. Further details of the process of determining affinity profiles are now provided with reference to FIGS. 6A and 6B.

Figure 6A:
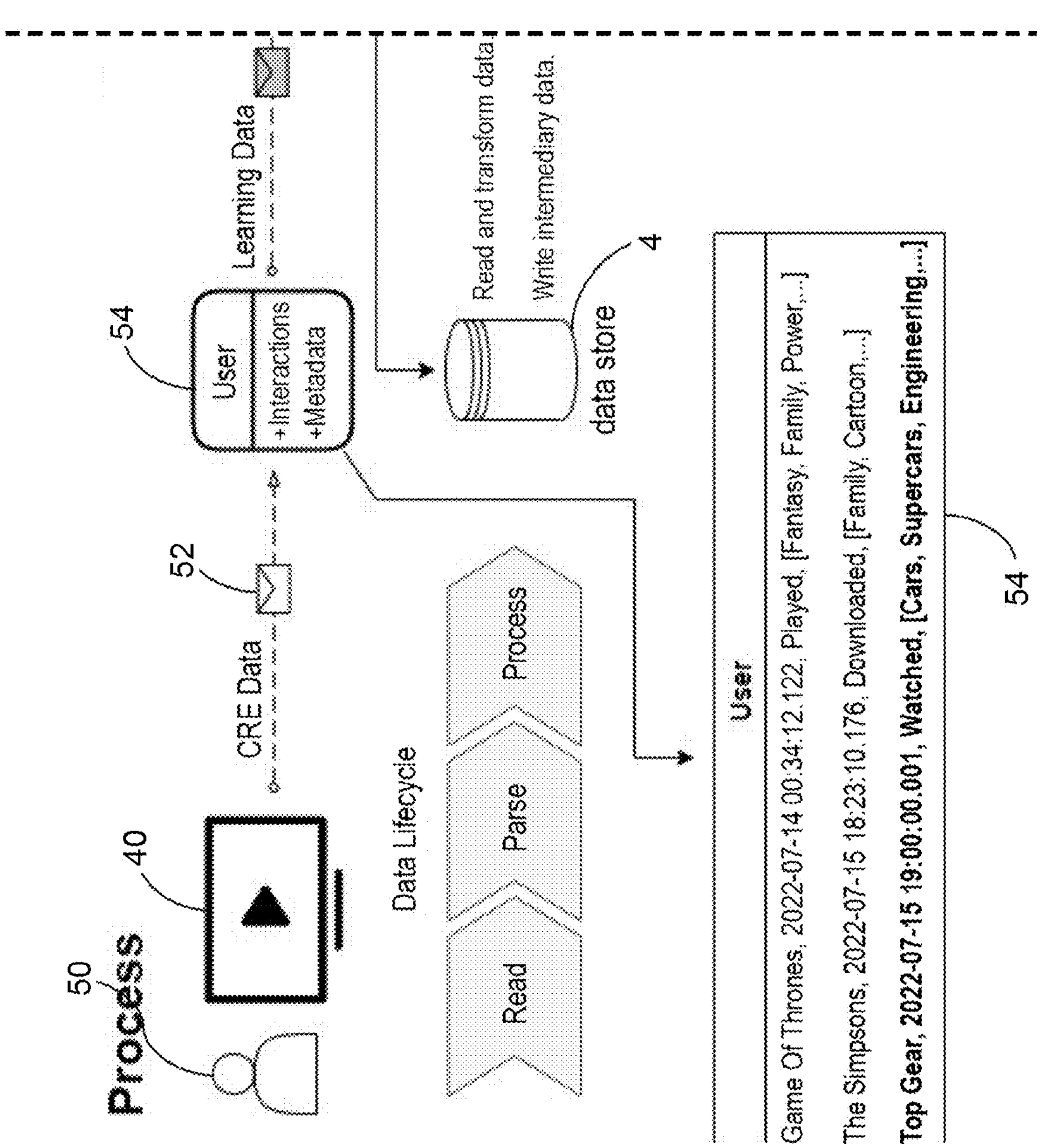
FIGS. 6A and 6B are schematic illustrations of the generation of an affinity profile using the system of FIG. 1.
Figure 6B:
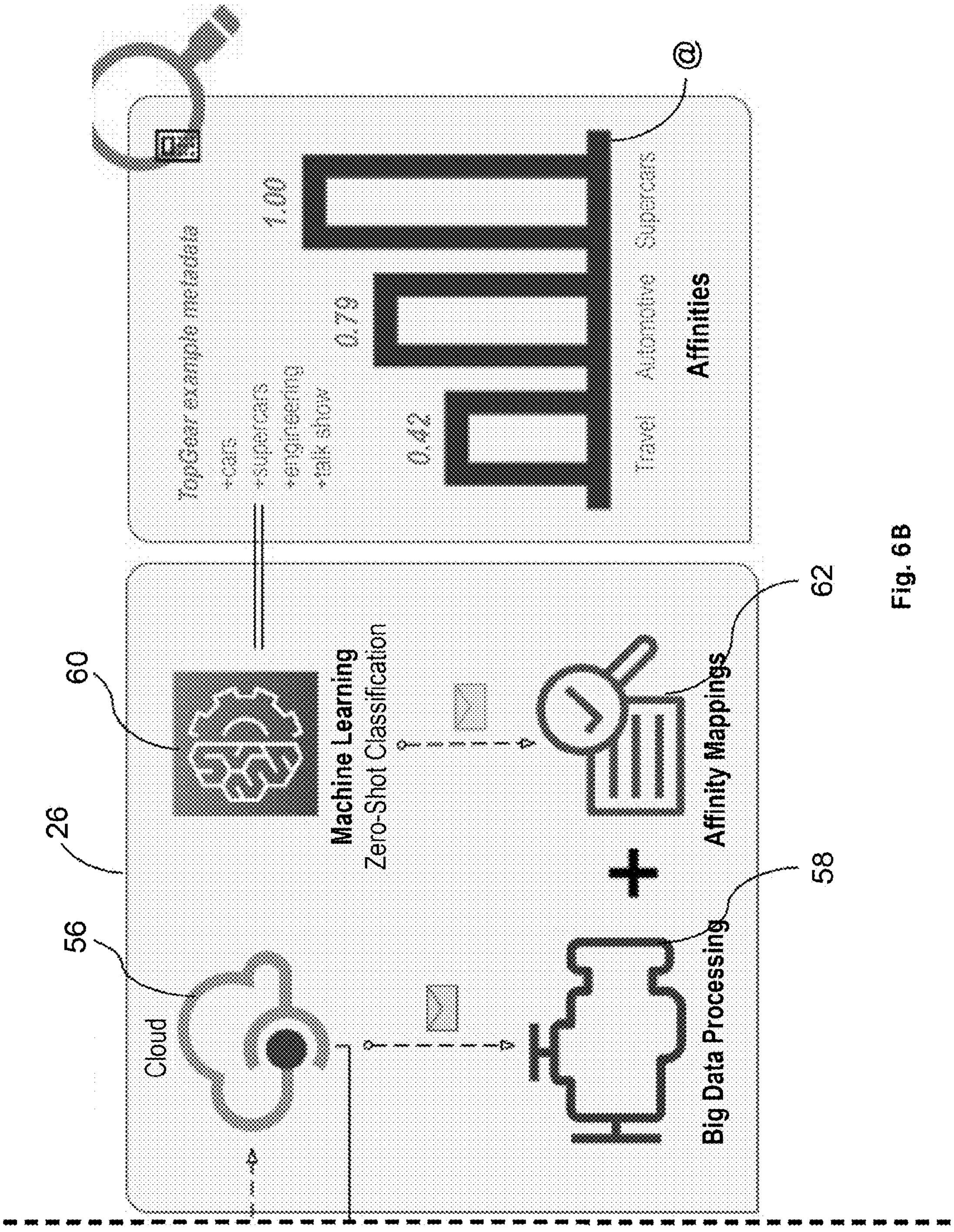

FIGS. 6A and 6B illustrate schematic generations of an affinity profile using the system of FIG. 1. Only certain components of the system of FIG. 1 are included in FIGS. 6A and 6B, for clarity.

FIGS. 6A and 6B show a user 205 watching a television programme that they have selected on user device 40. Data 52 representing the user's activity is sent to the affinity profile and recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user.

A user record 54 for the user is illustrated schematically in FIGS. 6A and 6B. An expanded version of at least part of the user record is also shown in FIGS. 6A and 6B for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIGS. 6A and 6B. For example, at least the meta data items cars, supercars and engineering are associated with the Top Gear episode. In practice there will be many more items of meta data associated with each item of content.

In general, a user record 54 will include records of far larger numbers of items of content than shown for the purposes of illustration in FIGS. 6A and 6B. However, such a small number of items of content might be found for a new user or for a temporary user of a system. For example in some embodiments, the system may be used for a user who is a guest in a hotel or traveller in a vehicle or transport system, and it is a feature of some embodiments that affinity profiles can be generated even for such temporary or short-term users.

Next, user data in respect of the user 205 is sent to the affinity profile module 26 in order to generate or update an affinity profile for the user 205.

The entire user record is sent to the affinity profile module 26 each time the affinity profile for the user is to be updated, and the affinity profile is regenerated based on the entire user record.

In other modes of operation, it is possible for changes to the user record to be sent to the affinity profile module, and then the affinity profile for the user is retrieved and updated based only on the changes to the user record (for example based on the user having watched one or more new items of content).

In the example shown in FIG. 2, for simplicity for the purposes of illustration, the user record sent to the affinity profile module 26 consists only of the record for the latest item of content viewed, in this case Top Gear.

In this example, the user record includes the metadata items 'cars', 'supercars', 'engineering' and 'talk-show'.

The affinity profile module 26 in this embodiment then performs a search of various data sources 56, for example in the cloud, to determine any other information concerning the item of content. For example, various databases can be consulted that include additional information concerning television programmes or other items of content.

In the present embodiment, the record for the item of content and any other information found from the search of data sources 56 is subject to processing by sub-module 58 that match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>:<keyword>. Features describe the content and include subjects, settings, themes and characters (for example, Wimbledon may contain the terms—subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment. Any suitable number of features can be included in the ontology, for example between 10,000 and 100,000 features, or more or fewer. For instance, around 30,000 or around 40,000 or around 50,000 features.

The metadata for the item of content is stored in the user record in the hard disk storage 4.

The affinity mapping module 26 loads a mappings file 62 that is, for example, stored in the hard disk storage 4. The mappings file relates/maps metadata terms from the ontology (e.g. the ontology of 38,000 items) to a set of affinity categories. Weightings or confidence scores are associated with the mappings in some embodiments.

For example, if the term 'car' appeared in both the ontology and the set of affinity categories there would be a high confidence score (e.g. 1 for a scale of 0 to 1) for the mapping between 'car' in the ontology and the term 'car' in the set of affinity categories. In another example, the term 'Wimbledon' in the ontology may be mapped to the affinity category 'tennis competitions' but with a lower weighing or confidence score.

Figure 7A:
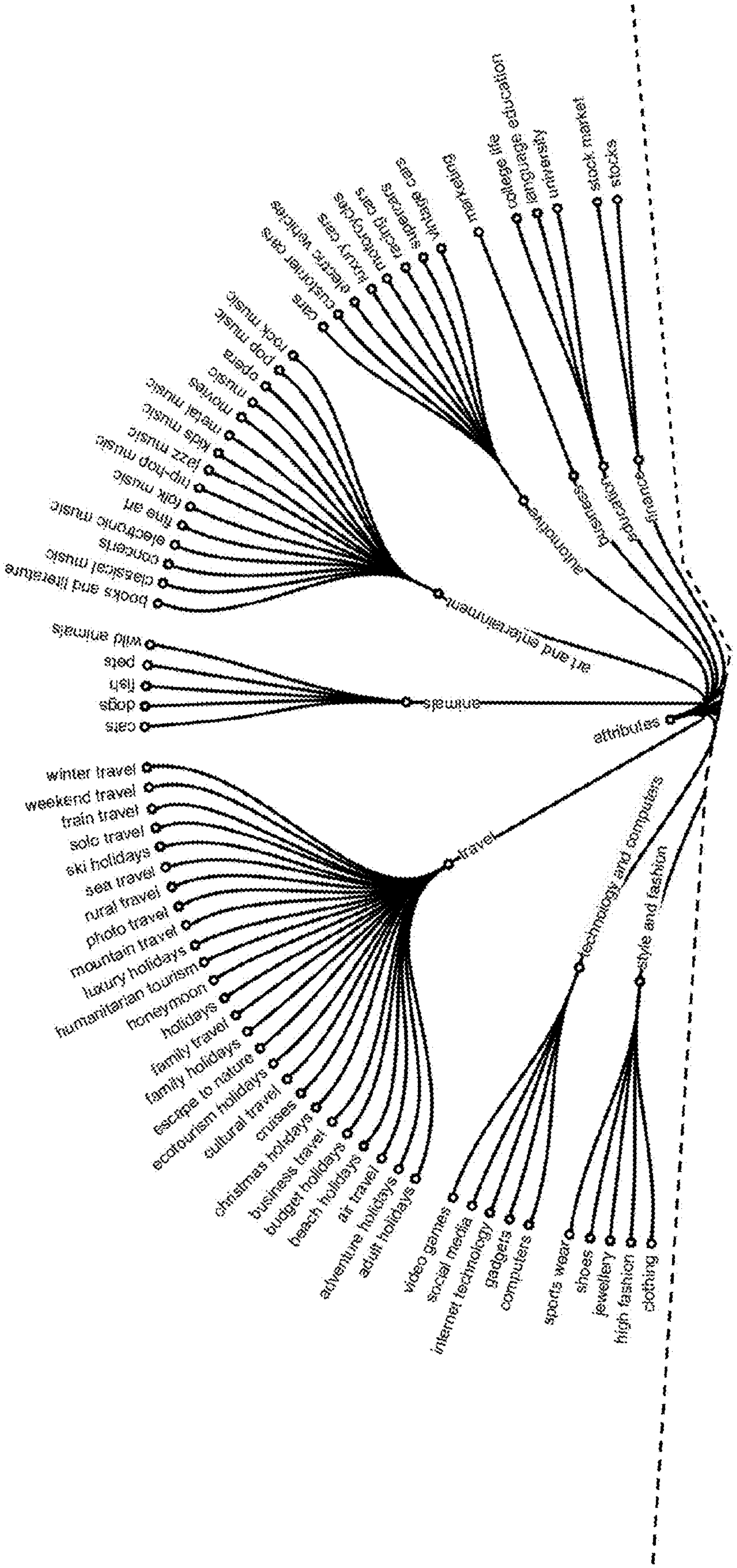
FIGS. 7A and 7B are charts showing some of the affinity categories used by the system of FIG. 1.
Figure 7B:
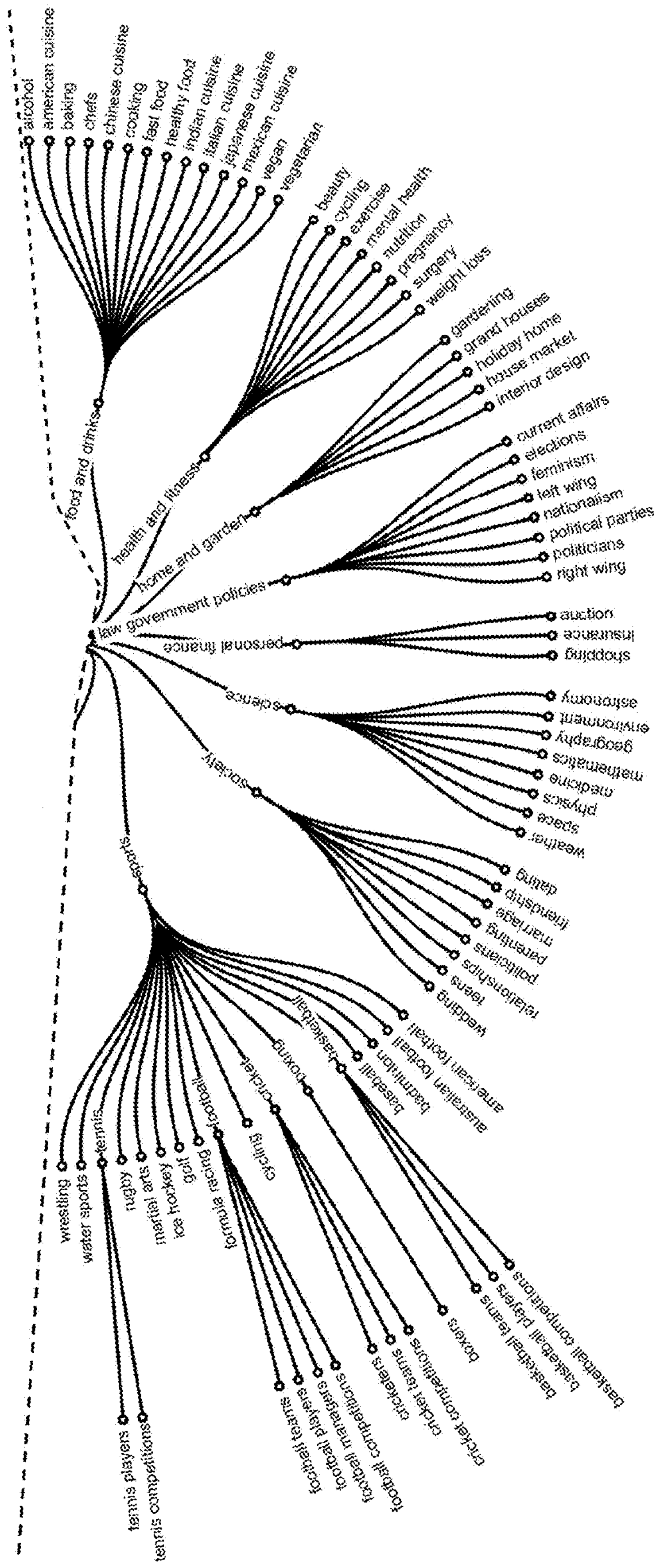

In the embodiment of FIGS. 6A and 6B, the set of affinity categories consist of around 160 categories, including 17 high-level categories and 139 sub-categories. FIGS. 7A and 7B show some of the categories, including some relationships between high-level categories and sub-categories by way of example. For instance, as shown 'tennis players' and 'tennis competitions' are sub-categories that fall within the higher-level category of 'tennis'.

The high-level categories and sub-categories of a set of categories in one embodiment are provided in the tables shown in FIG. 8.

Next, the user record and the mapping file, or a mapping obtained by applying the mappings to the metadata of the user record, are input to a profile generation module to process the input data to generate an affinity profile for the user based on the user record and the mapping file. The profile generation module aggregates the scores for each term, creating an affinity profile. The affinity profile comprising at least one selected affinity category or affinity category score, and the affinity categories are selected from the stored set of affinity categories, each representing a user's affinity for a respective subject area.

In the present embodiment, the profile generation module comprises code that performs aggregations to calculate the affinity profile for the user. In other embodiments, the profile generation module can comprise a further trained machine learning module.

In the example shown in FIGS. 6A and 6B, for simplicity and purposes of illustration, the user record that is being processed consists only of a record representing the most recently viewed content, in this case an episode of Top Gear. The affinity generation module 26, using the trained machine learning model, generates an affinity profile for the user that includes scores for three affinity categories, namely Travel (score 0.42), Automotive (score 0.79) and Supercars (1.0).

In the present embodiment, a thresholding process is performed on the output of the process such that affinity categories with a score below a threshold amount are omitted from the affinity profile.

Any suitable trained machine learning model may be used.

In the embodiments of FIGS. 6A and 6B, the machine learning model comprises a text classifier that is operable to receive text input relating to television, or other, content as part of the user record and to output the affinity profile. In particular, in the present embodiment, the text classifier comprises a zero shot classifier that provides for data classification based on text labels that were not used to train the model.

FIG. 19 is a flow chart that illustrates use of the text classifier, in the form of a zero shot classifier.

In similar fashion to that described in relation to FIG. 2, the process begins at stage 70 with extracting descriptive features for each title viewed by users. Stage 70 may be performed by the affinity profile module 26 using viewing data 72 that is included in user records as an input. The extracted features are represented within the ontology, which are designed for deep content understanding.

These features are then used as input to a zero-shot classification model at stage 74, which classifies them against a known set of affinity categories. The zero-shot classifier assigns scores to each of the features based on their semantic relationship to the affinities. These scored features are then used at stage 76 as input into a calculation engine that cumulatively evaluates the scores for each affinity category, resulting in a propensity score being calculated for each affinity at stage 78. The calculation engine and classifier may, for example, be provided as part of affinity profile module 26, or may be provided as separate components, for example a separate calculation module and separate classifier module.

The zero-shot classification model in this example has been trained on a rich feature taxonomy, allowing it to score features outside the context of the around 40,000 features (e.g. 38,000 features) based on textual and semantic similarity. This allows the model to generalize to new features and make more accurate predictions, even when it has not seen those features during training.

The resulting dataset, consisting of propensity scores for each affinity category, can be used to target specific audiences, for example for addressable TV advertising or any other suitable purpose. This approach allows for more accurate and effective targeting.

The diagram of FIG. 19 is an overview of the process, and the actual process can be more complex and involve sub-processes. The following further details of the process according to some embodiments are provided in the following bullet-pointed list.

Viewing activity: The viewing activity is represented by a set of viewing records, each record contains the title of the content and the user who viewed it, for example in the form of or comprised in the user records Extracting descriptive features: The viewing activity is passed through an extractor that matches the content titles with an ontology of, for example, up to 40,000 features, designed for deep content understanding. Each record is represented by a set of feature IDs.

Zero-shot classification: The feature IDs are passed to a zero-shot classification model that was trained on a rich feature taxonomy, this allows the model to score features outside the context of the, for example around 40,000, features based on textual and semantic similarity. The output of this step is a score for each feature.

Calculation engine: The scored features are passed to a calculation engine that cumulatively evaluates the scores for each affinity category, resulting in a propensity score for each affinity.

Propensity score: The output of this process is a dataset of propensity scores that can be used for addressable TV advertising or other desired purposes.

Zero-shot classification may be considered as a type of machine learning where a model is trained to recognize and classify objects or entities that it has never seen before, based on information about other, related entities. This may be done by training the model on a set of "base classes" and then providing it with additional information, such as attributes or semantic relationships, about "novel classes" that the model has not seen before. The model can then use this information to classify new examples of the novel classes, even though it has never seen any examples of those classes during training. This allows the model to generalize to new classes and makes it more flexible and adaptable in real-world applications.

In a simple example, the Base Classes (Affinity Segments) may be, for example, Sports, Travel, Cooking, Arts, Motors, Fashion. The training data may then comprise examples of features with scores for associated base classes. The model would be trained on the features describing the base classes (affinities), so that it can learn to recognize and classify them based on the vocabulary, grammar and semantics of the text. Then, when it encounters new examples of the affinity classes, it can use the additional information (typically synonyms) to accurately classify new examples. This allows the classifier to accurately give scores that represent the semantical relationship between features and affinities.

Any other suitable classifier, zero-shot classifier or other machine learning model may be used in other embodiments, for example any suitable classifier, zero-shot classifier or other machine learning model in accordance with known techniques.

In some embodiments, the process can be applied directly to the metadata without also enriching or mapping to or otherwise using the ontology. In some embodiments more than one trained model is used, for example one or more trained models to enrich or modify metadata associated with items of content based on the ontology or other further data set, and one or more models to determine affinity profiles based on the user record.

In practice, for users with a reasonably lengthy viewing history the user record for the user will be representative of many items of content that the user has viewed or otherwise interacted with, and the affinity profile will be representative of a wider range of interests, and will include a larger number of affinity categories having non-zero scores. The relative scores for different affinity categories in the affinity profile for the user shows the relative importance to the user of different areas of interest.

Figure 9:
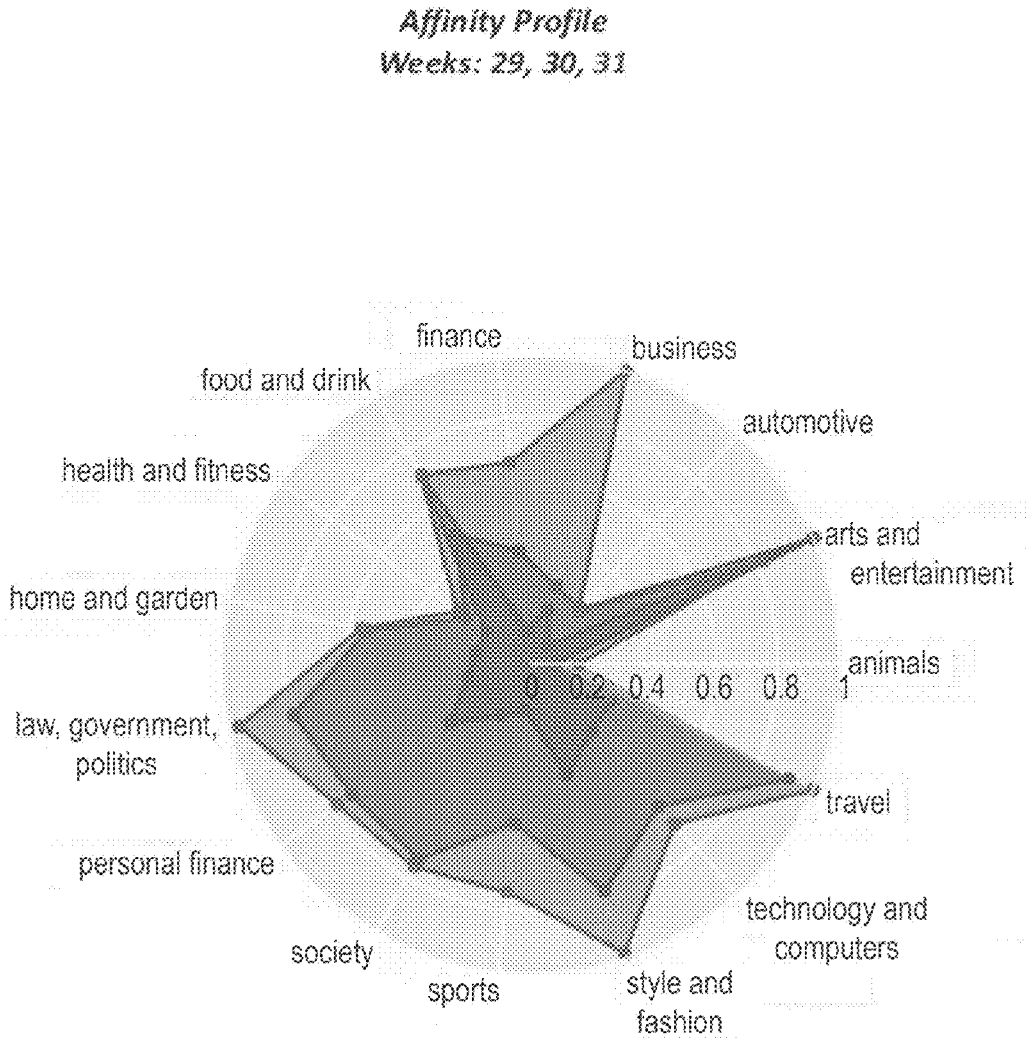
FIG. 9 is a representation of an affinity profile for a user.

FIG. 9 shows a graphical representation in the form of a plot of an affinity profile for user 205 based on their viewing or other actions in relation to television content for three successive week-long time periods (weeks 29, 30, 31 as indicated in the plot). The affinity profile for the user comprises a set of scores, each score being for a respective one of the affinity categories.

It can be seen from the affinity profile plot in FIG. 9 that the user 205 has particular interest in: travel; style and fashion; law, government politics; arts and entertainment; and business based on their activity in week 31. It can also be seen that the affinity profile varies week by week, based on variation in viewing and other actions by the user. Further discussion of the time variation of affinity profiles of users is provided below.

As already noted, the stored set of affinity categories can comprise a plurality of sub-categories within at least some of the categories, and the set of scores can include scores for at least some sub-categories. Such sub-category scores are not shown in the plot in FIG. 9, but alternative representations of the user profile can be provided that concentrate on score for particular categories or sub-categories. A variety of actions can be performed based on an affinity profile for a user, and the actions can be based on score for particular categories or sub-categories of interest as desired, as well as or instead of based on the overall affinity profile.

Any suitable graphical representation of an affinity profile for a user can be provided, for example any suitable 2D or 3D graphical representation whose shape or other property is based on scores for different categories or sub-categories may be provided. In some cases graphical representations of affinity profiles for a plurality of users and/or for a user(s) at different times may be overlaid or otherwise displayed simultaneously if such display is helpful in illustrating affinities of users of populations of users.

A significant feature of the embodiment of FIGS. 1 and 3 is that affinity profiles for users can be generated independently of, or can be performed without taking into account, data representing socio-economic or demographic status of the user. Indeed, user affinity profiles can be generated automatically based only on the user's viewing, downloading or storing of, or other interaction with, television or other content.

It will also be understood that, given the number of viewers of a particular TV operator's services, affinity profiles for a large number of users can be generated automatically and rapidly.

This approach can provide significant benefits for TV operators in particular. For example, using the system's content metadata capability, for instance the ontology of over 38,000 terms in this example, the system can provide a TV operator with a rapid implementation of a wide range of sophisticated and automated targeting attributes using the information extracted from the TV operator's own, distinct viewing data.

The TV operator's viewing data can be transformed into a huge set of targeted affinity attributes based on an affinity model created, in the present embodiment, from hundreds of millions of viewing data points worldwide. Such set of targeted affinity attributes for a large number of users can be created automatically even with days or weeks, and without requiring time-consuming gathering of demographic and other data from external sources. Such demographic and other data from external sources can often be out of date, of variable accuracy, and time consuming to integrate and manage consistently. Nevertheless, in some embodiments, the attribute profiles of users can be supplemented with such demographic and other data. For instance, in some embodiments such demographic and other data can be used as a further input to the trained model.

The anonymity of users can be maintained in any suitable manner. For example, in arrangements such as those shown in FIGS. 1 to 4, where the affinity profile and recommendation system 2 and the content provider 210 are separate systems, the affinity profile and recommendation system 2 and the content provider 210 may be configured such as to restrict or not allow access to personal information, or data that could be used to determine the name of a user, or demographic information concerning the user, by the affinity profile and recommendation system 2, even if such information or data is stored at, or accessible to, the content provider 210. The method performed in such embodiments may comprises restricting or not allowing access by the computer apparatus to personal information concerning individual users and/or data that could be used to identify the user.

Methods can include monitoring of activity of the temporary and/or anonymous user during a single or initial content viewing session, and can include providing an empty or default user record for the user at the start of the single or initial content viewing session, and the generating an affinity profile for the user is based on activity during the single or initial content viewing session.

In some cases, even the content provider 210 may not have access to personal information concerning individual users, or know who individual users are. For example, a purchaser of a Smart TV or a user of a publically accessible device, for example in a train, aeroplane or other mode of transport, may use the device without providing personal information. Methods according to embodiments can enable user-specific affinity profiles to be built rapidly even without access to any personal or demographic information.

User anonymity may be preserved at the affinity profile and recommendation system 2. This can be particularly useful in the context of increasingly stringent data regulation requirements. The ability to target advertising or other content, or to optimise a user's experience and efficiency of use of a content distribution system, whilst maintaining user anonymity can enable an operator of affinity profile and recommendation system 2, and customers using data from such a system, to fall outside the most stringent of data regulation requirements, as user affinities may be obtained whilst maintaining strict user anonymity.

In some embodiments that use machine learning models, for example in determining affinity profiles or for subsequently using affinity profiles as an input to machine learning models for particular purposes, the machine learning model during the training phase may itself have access to demographic data or other data relating to users that extends beyond content viewing data, even if the trained machine learning model in use does not have access to, or use as an input, such demographic data or other data relating to users. For example, training data sets for the machine learning model(s) can include demographic data even if the data on which the machine learning model does not include such demographic data. Thus, the trained machine learning model (s) may be able to determine one or more demographic-related features based on user affinity profiles alone, which in turn may be based on user actions alone, in some embodiments.

The set of user attribute profiles can be used for a wide range of purposes. In one example the attribute profiles can be used for targeted advertising, for example to select a subset of users to receive particular items of advertising content that are aligned to the user's interests or activities as represented by the attribute profiles. One feature of certain embodiments is that the set of attribute categories may be aligned with categories that are used in digital advertising.

It is feature of some embodiments of the system that the affinity profile module 26 can provide outputs configured to be used directly by digital advertising or other systems, for example in the form of reports or files in suitable formats. In some embodiments, an application programming interface (API) and/or an operator interface can be provided that enables user of a digital advertising or other external system to access and/or request and/or manage user attribute profiles or sets of user attribute profiles, or reports, from the affinity profile module 26 or other component of the system.

As mentioned above, some variants of the embodiments of FIGS. 1 to 4 may be provided without the CRE 22, or without the CRE 22 being operational, and/or without providing content recommendation functionality. In some such variants, outputs of the user learning module 24 and/or the affinity profile module 26 may be provided to an external operator, for example, to the operator of the or a TV service, and/or to an operator of an advertising platform, and may bridge a gap between the TV operator's data and any existing advertising or other platform that the TV operator, advertising platform operator, and/or other external operator, already has.

The operator of the system, or of the external system, is able to select, manage or push, specific items of content, for example items of advertising content, to particular users or sets of users based on affinity profiles without necessarily taking into account data representing socio-economic or demographic status of the users (although such socio-economic or demographic status can in some examples be used to supplement or enrich the attribute profiles, or can be used additionally in the processes of determining the attribute profiles).

It will be understood that the user attribute profiles for sets of users can be processed, analysed and/or visualised to suit any particular purpose.

FIGS. 10 to 13 show some representations of user affinity profile data obtained by the embodiment of FIG. 1 applied to some tens of thousands of users of a particular TV operator's TV distribution system, in one example.

Figure 10:
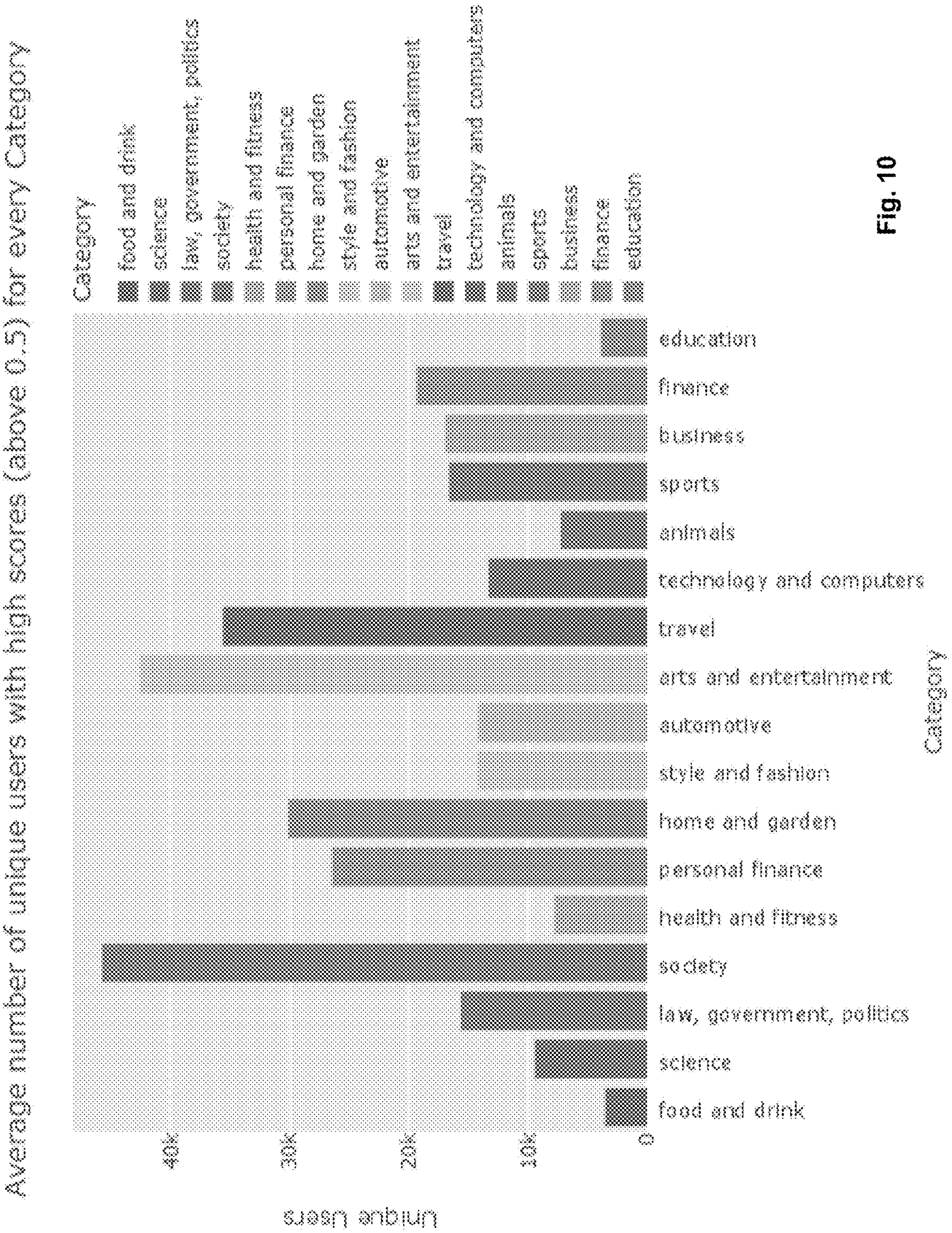
FIG. 10 is a bar chart showing average number of unique users with high scores (above 0.5 on a scale of 0 to 1) for every category of the high-level categories, for a set of users.

FIG. 10 is a bar chart showing average number of unique users with high scores (above 0.5 on a scale of 0 to 1 in this example) for every category of the high-level categories used in this example.

Each category in FIG. 10 is mutually exclusive, with viewers categorized based on their distinct interest in each affinity. It can be seen a larger proportion of highly engaged users are captured by the three categories of Society, Arts and entertainment, and Business.

Niche categories, with a small proportion of users exhibiting high interest, were Travel, Food & drink, Education, Animals, Health & fitness.

FIG. 10 is based on the high level attributes categories. Analysis can also be performed on the 139, in this case, subcategories to provide more targeted analysis. Such precise targeting may, for example, improve response and conversion.

Figure 11:
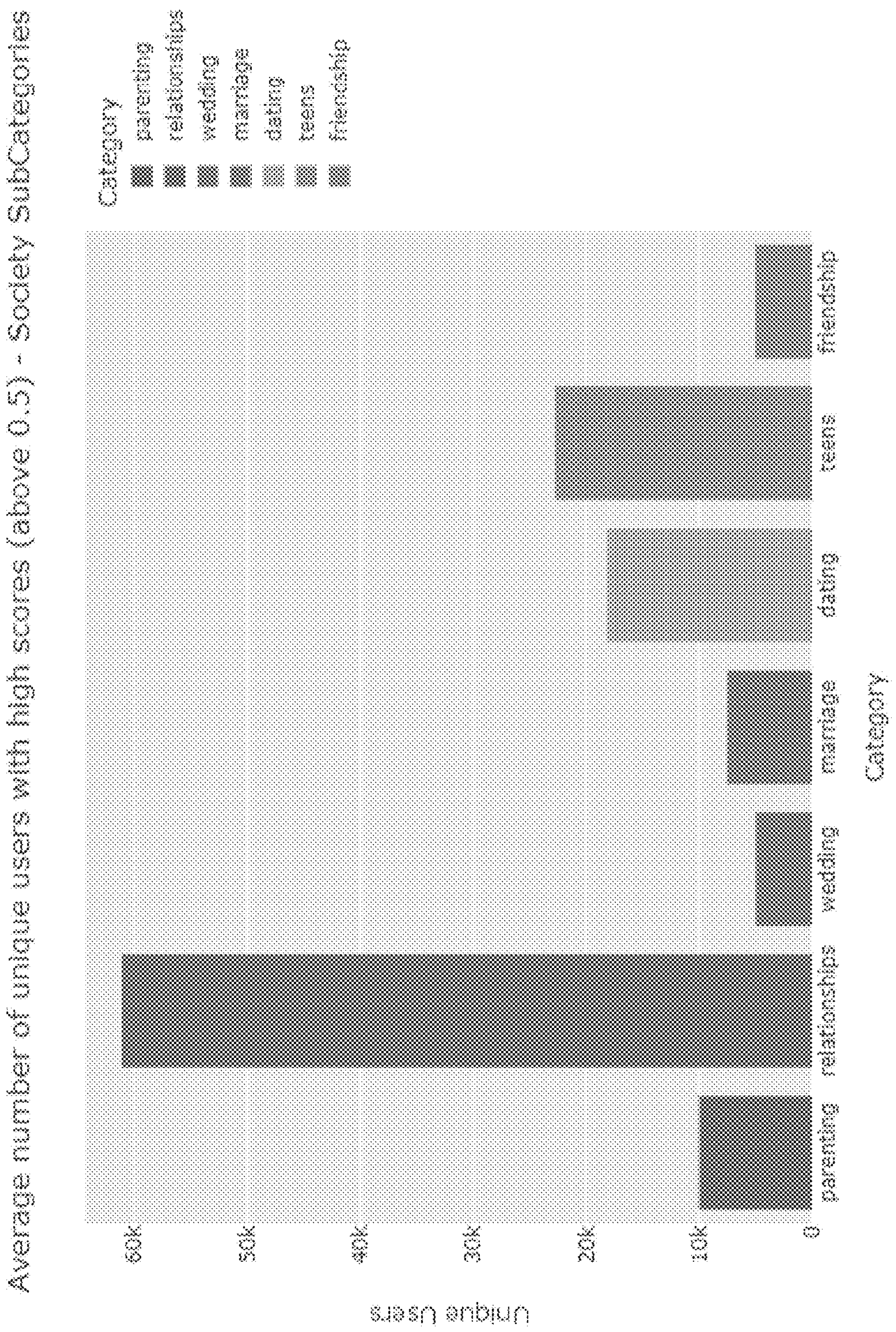
FIG. 11 is a bar chart showing average number of unique users with high scores (above 0.5 on a scale of 0 to 1 in this example) for sub-categories within the Society category, for a set of users.

For instance, FIG. 11 is a bar chart showing average number of unique users with high scores (above 0.5 on a scale of 0 to 1 in this example) for sub-categories within the Society category. It can be seen that the Relationships subcategory has the highest interest across the user base in this example.

Figure 12:
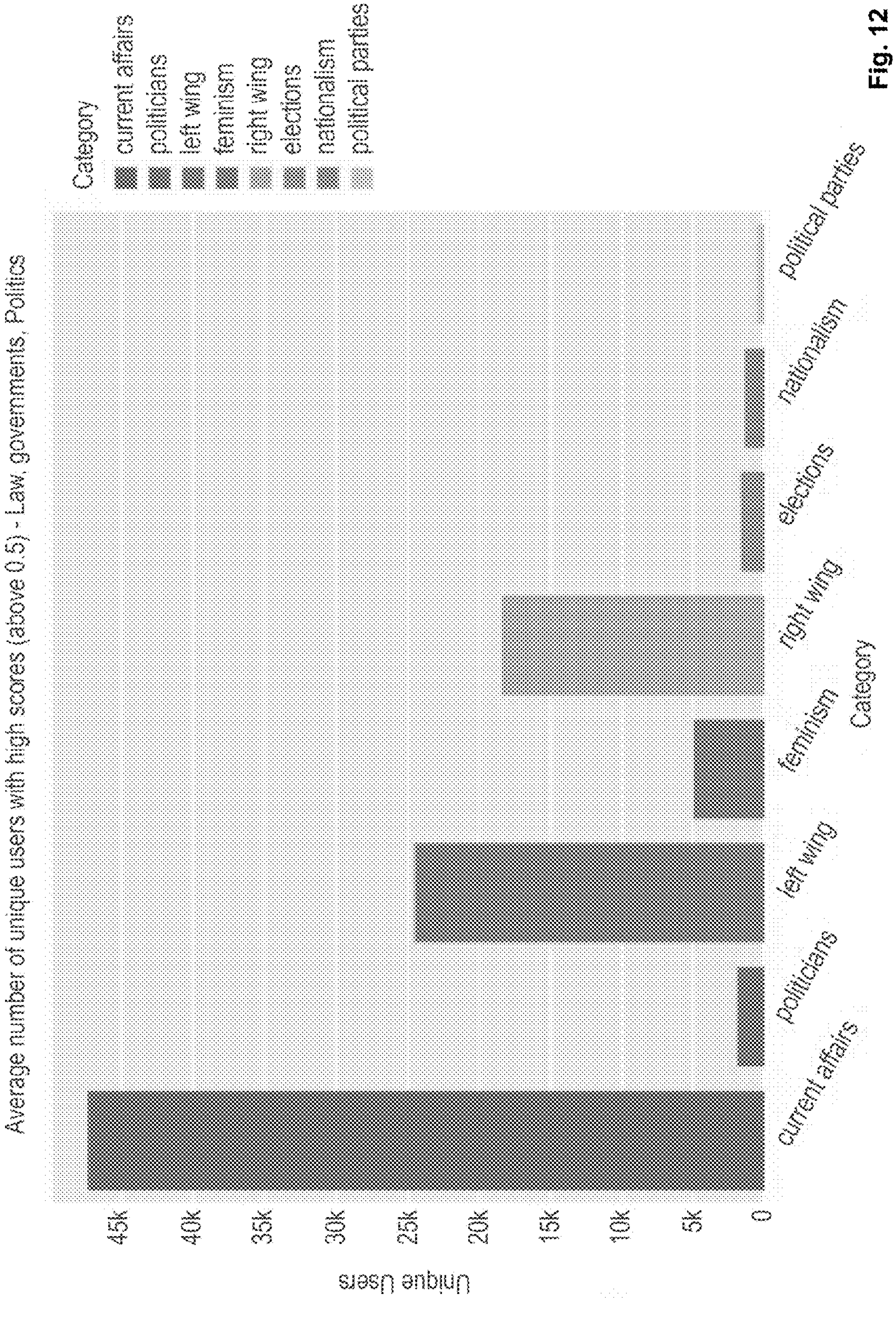
FIG. 12 is a bar chart showing average number of unique users with high scores (above 0.5 on a scale of 0 to 1 in this example) for sub-categories within the Law, Government, Politics category, for a set of users.

FIG. 12 is a bar chart showing average number of unique users with high scores (above 0.5 on a scale of 0 to 1 in this example) for sub-categories within the Law, Government, Politics category. It can be seen that Current Affairs (e.g. the news) subcategory has the highest interest across the user base in this example.

Figure 13:
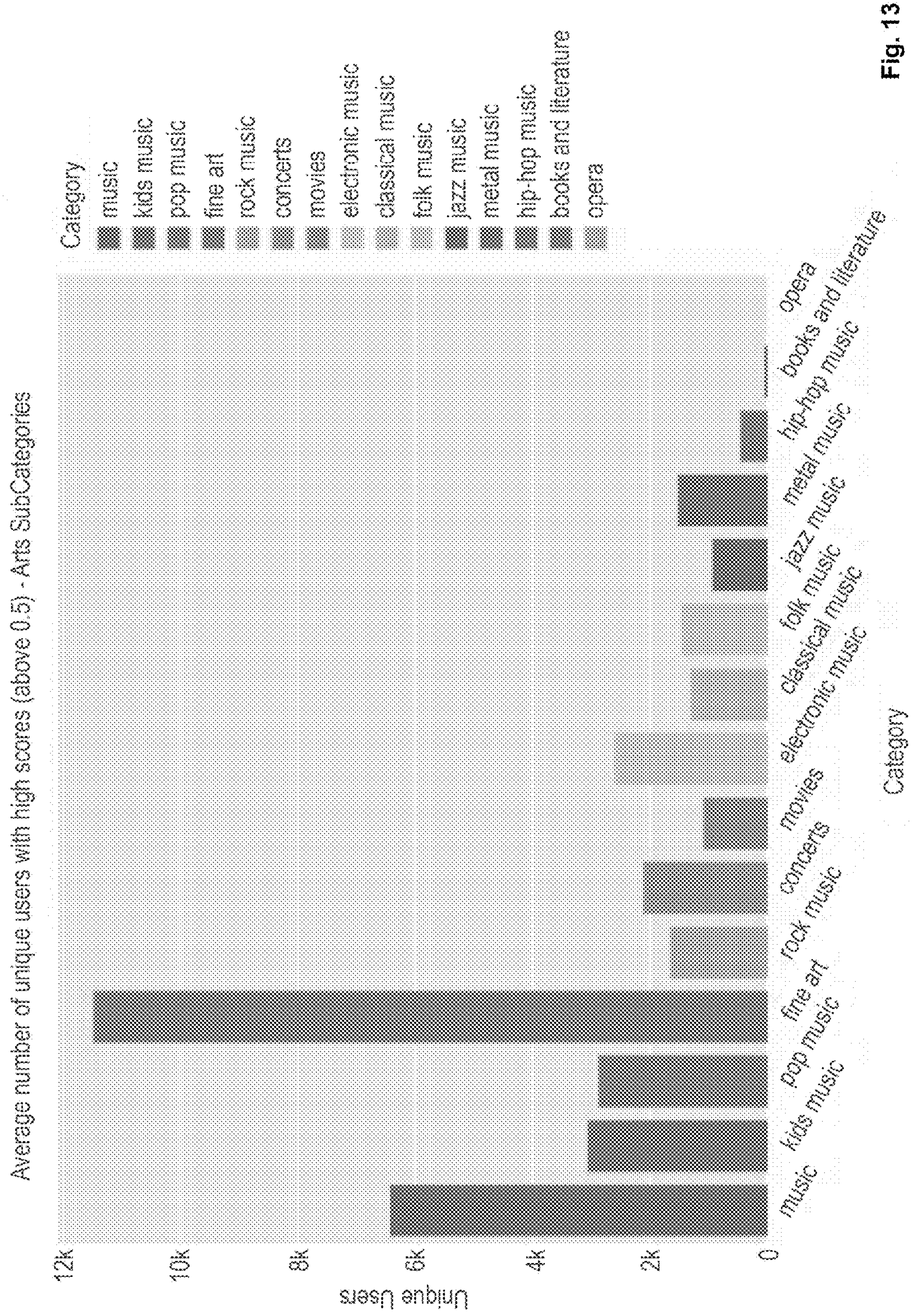
FIG. 13 is a bar chart showing average number of unique users with high scores (above 0.5 on a scale of 0 to 1 in this example) for sub-categories within the Arts and Entertainment category, for a set of users.

FIG. 13 is a bar chart showing average number of unique users with high scores (above 0.5 on a scale of 0 to 1 in this example) for sub-categories within the Arts and Entertainment category. It can be seen that the Fine Art and Music sub-categories have the highest interest across the user base in this example.

As already mentioned briefly in relation to the user attribute profile for a single one of the users shown in FIG. 9, the time variation of attribute profiles may be analysed and monitored. This can, for example, provide useful information concerning time variation of user interest in particular categories or sub-categories both for the overall set of users, and for sub-sets of the users for example even individual users.

Such analysis of variations with time may, for example, enable identification and quantification of detailed viewing changes. In the case of advertising applications, this may for example enable better campaign evaluation & targeting prediction.

Figure 14:
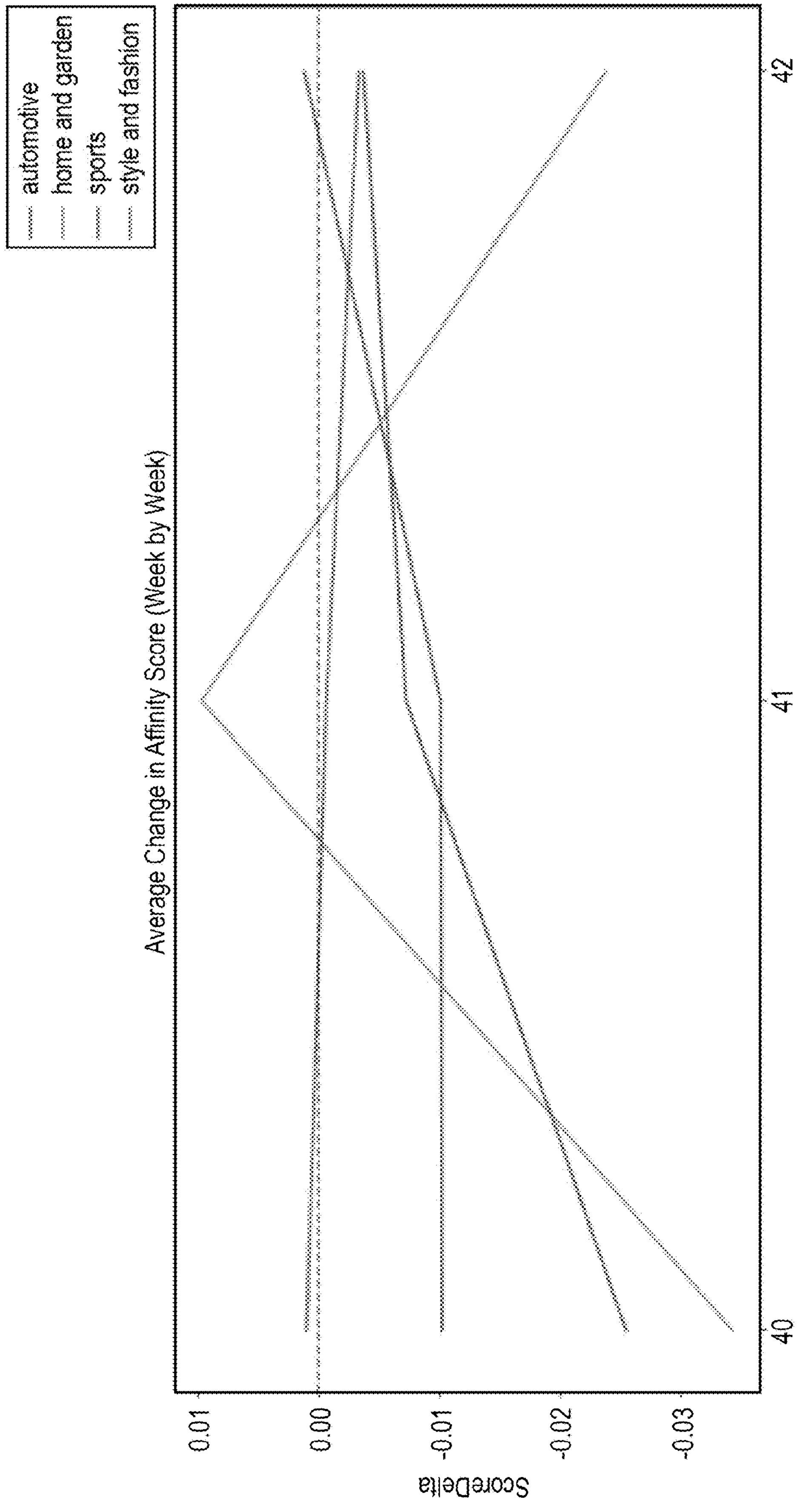
FIG. 14 is a plot showing average change in affinity score, week by week, across all users and for certain selected higher-level categories, for a set of users.

By way of example, FIG. 14 shows average change in affinity score, week by week, for weeks 29, 30 and 31, across all users and for certain selected higher-level categories (in this example, Automotive, Home and garden, Sports, and Style and Fashion).

It can be seen that there was a strong increases in increase in Home and garden affinity for week 29, across all users. It may be, for example, that a correlation with external factors, for instance public holidays, school holidays, weather conditions and/or time of year may be established, which in turn could be used for predicting when similar increases or decreases in other higher-level categories or sub-categories may occur in future.

In the context of, for example, advertising the sensitivity of the time variation of sub-categories could be used to plan the timing and extent of an advertising campaign or event. For example, a garden supplies retailer may be aware that generally high sales activity occurs in spring, and may use affinity data such as that shown in FIG. 14 to refine when TV viewers may be most likely to engage with TV programmes relating to homes and gardens. For example, it could be determined that spikes in viewing of homes and garden TV programmes may occur just before school holiday, in springtime, and when the weather is good. A garden supplies retailer may have a TV advertisement or TV advertisement campaign ready, but may then select the exact day or week for which the TV advertisement or TV advertisement campaign slot or slots are to be purchased, within home and garden-related TV programmes, based for example on the weather forecast and the timing of holidays, using the assessment of historic time-variation of affinity category scores as shown in FIG. 14.

An analysis such as that illustrated in FIG. 14 may be used to determine and/or illustrates general trends and can be applied to every one of the higher-level affinity categories or sub-categories (e.g. each of 156 sub-categories in one example). Significant variations will generally be easier to determine in the sub-categories, whereas week-to-week variations will generally be subject to less week-to-week variation given the breadth of the higher-level categories.

Furthermore, understanding historical viewing dynamics can improves campaign evaluation and proof of targeting efficacy. Predicting future attractiveness of affinity categories can adds significant value to targeting attributes.

Figure 15:
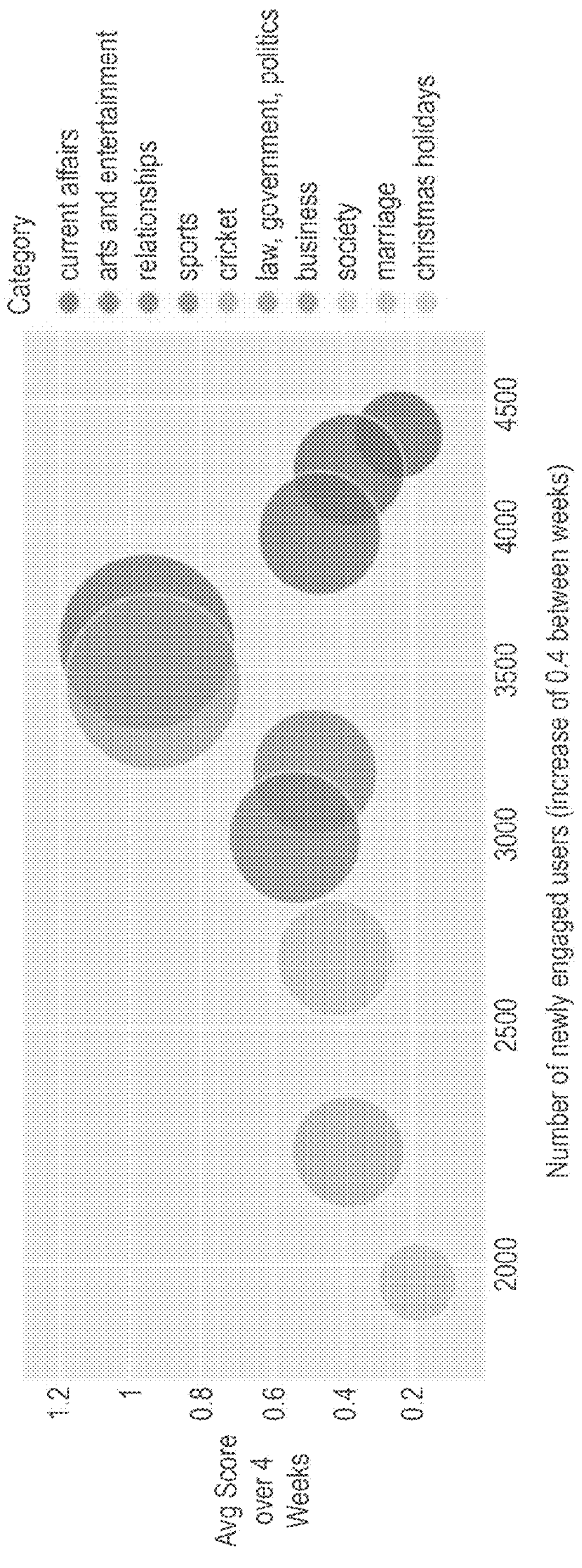
FIG. 15 is a plot of affinity categories with most new users (from a sample of 1205,000 users of a TV provider's content distribution system) determined from average affinity category scores over a four week period.

Hyper-targeted campaigns may also be based on user engagement, as engaged audiences are generally known to more receptive, and/or responsive, to advertising or other content. FIG. 15 is a plot of affinity categories with most new users (from a sample of 1205,000 users of a TV provider's content distribution system) determined from average affinity category scores over a four week period. The number of newly engaged users (determined as the number of users having an increase in affinity category score of 0.4 or more, over the four week period, for the indicated affinity categories). The analysis illustrated by way of the plot of FIG. 15 may, for example, be used to determine top categories for viewers that exhibited a high sustained shift in interest. This may, for example, enable a TV operator, advertiser or other third party to target those segments of viewers most receptive to advertising or to other content or activities.

The monitoring of variation in affinity profiles over time can, for example, enable a dynamic understanding of portfolio viewing. For instance, identifying users with consistent and high interest can be of particular value. Such users may be reliably made the target of corresponding items of content, for example they may be valuable to advertisers in a specific area as they are likely to be reliably receptive to advertisements that correspond to the affinity categories which they have a persistent interest.

Figure 16:
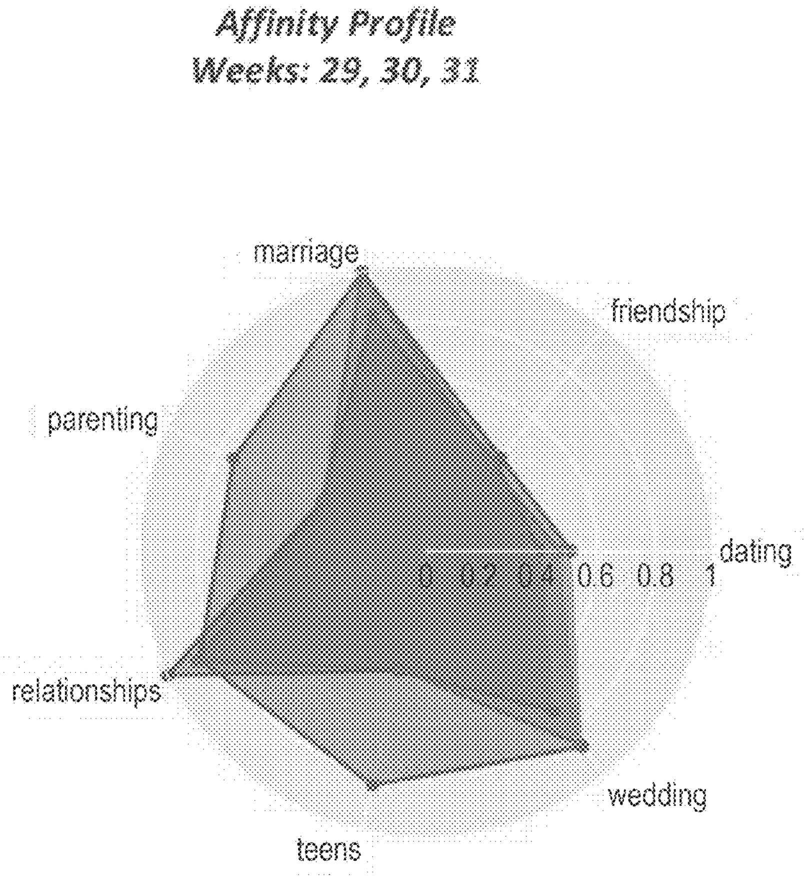
FIG. 16 is a representation of an affinity profile for a user.
Figure 17:
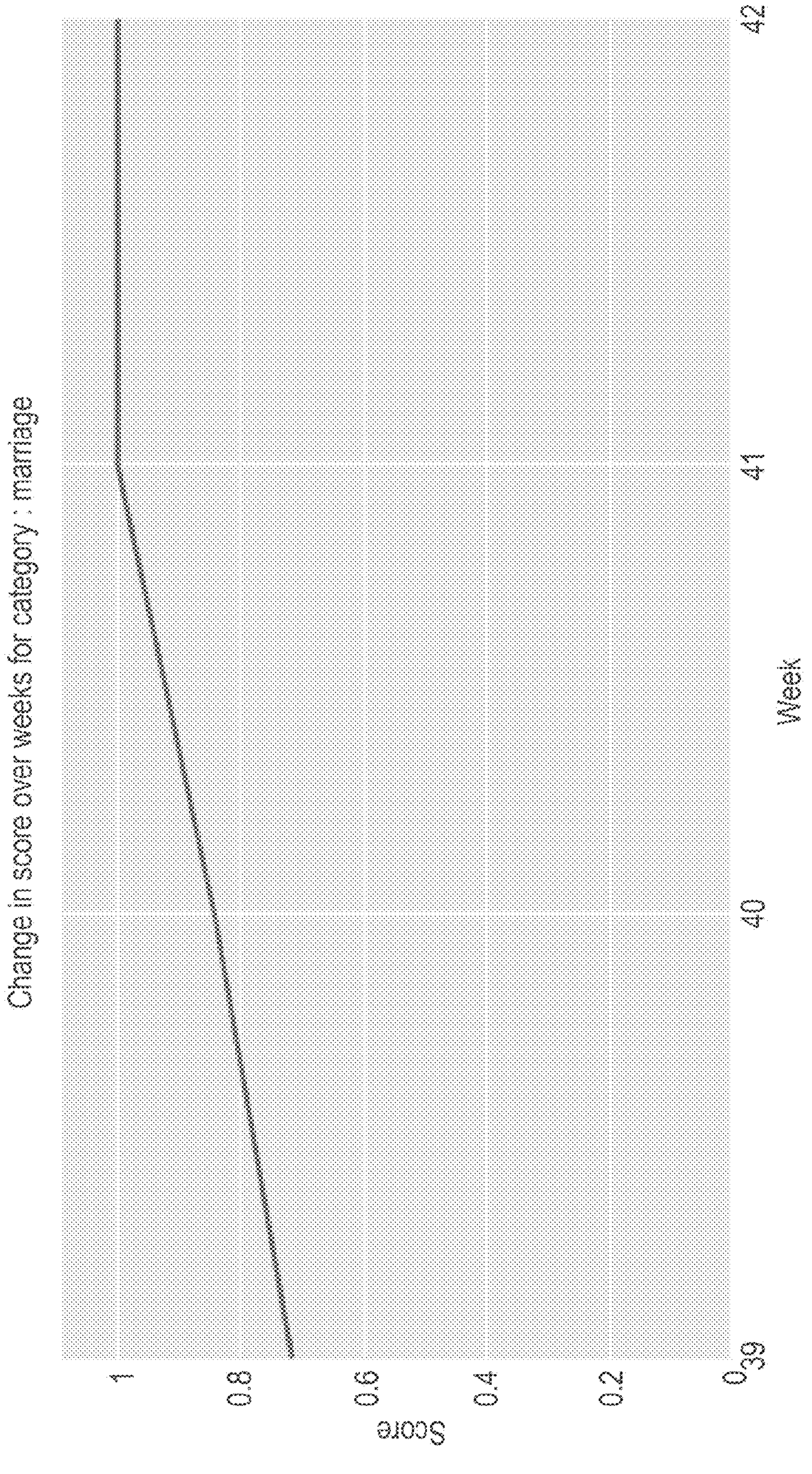
FIG. 17 is a plot of affinity scores for the sub-category 'Marriage' for weeks 29, 30 and 31 for the user that is the subject of FIG. 16.

By way of example, FIG. 16 provides overlaid plots of affinity sub-category scores for subcategories within the society and relationships category for one particular user for weeks 29, 30 and 31. This is an example of a static user with an interest in society and relationships content. They shows consistently high affinity scores with the category, with identified interest in multiple relevant sub-categories. Tracking behaviour over time in this manner can be used to identify users with sustained interest in affinity categories or sub-categories. For instance, FIG. 17 is a plot of affinity scores for the sub-category 'Marriage' for weeks 29, 30 and 31 for the user that is the subject of FIG. 16, and shows a consistently high interest in this topic. As discussed, the identification of this user as being interested in this topic of 'Weddings' is based solely in this example on the application of the trained machine learning model on the user record for the user, for example the metadata associated with viewed programmes enriched using the mapping file and the ontology of 38,000 items. Such specific and time-dependent and sensitive identification of a user as being interested in a particular topic would not be possible with any accuracy or time-sensitivity using traditional TV assessment techniques based on demographic or socio-economic data.

In further modes of operation, the system of the embodiment of FIGS. 1 and 3 may be used to track viewing changes to predict intention of a user or users to perform certain actions, to be involved in certain activities or to make purchases in a certain area. For example, analysing affinity profiles and affinity score changes can be used to identify viewing dynamics that can indicate a life stage change.

Figure 18:
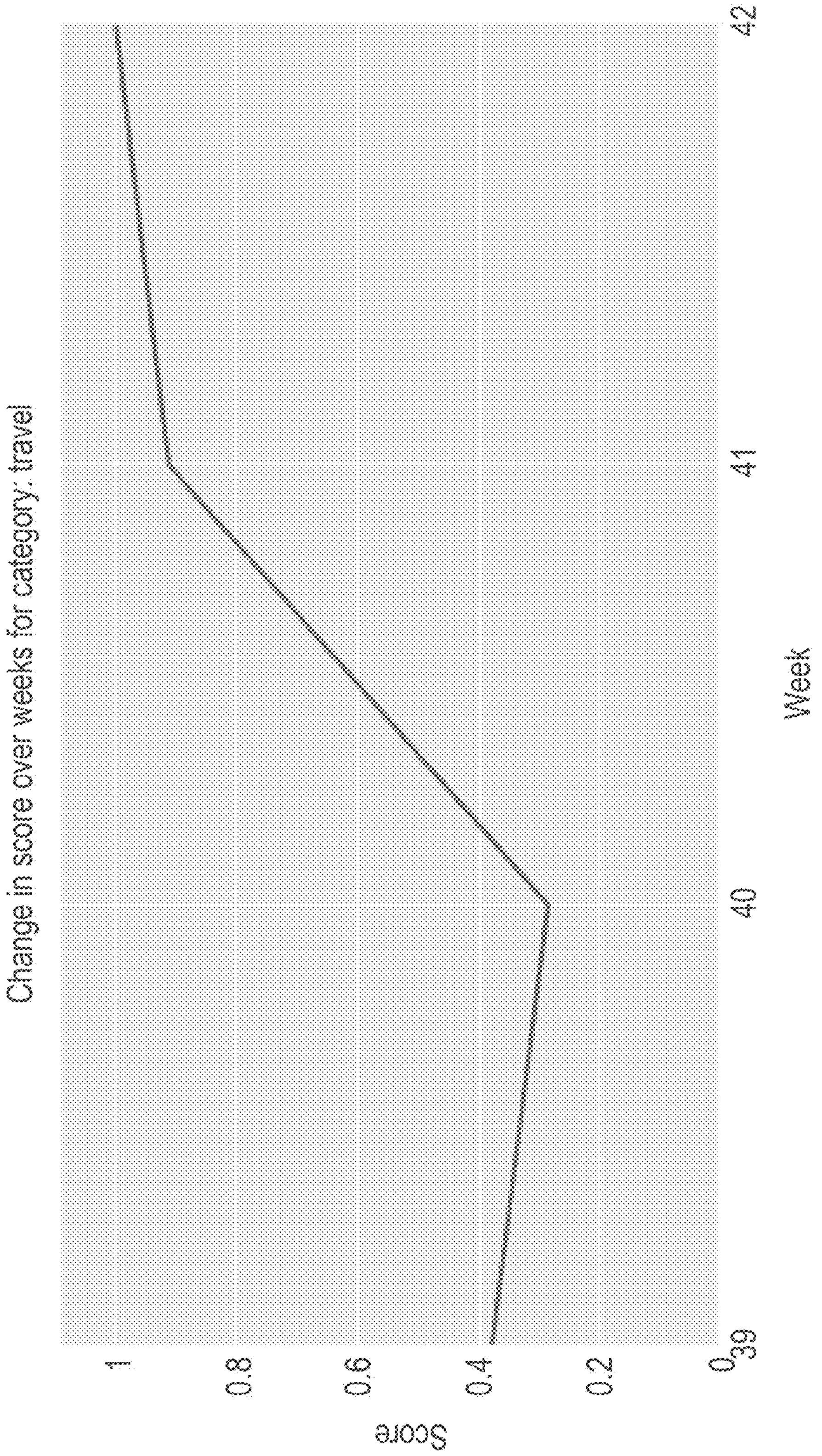
FIG. 18 is a plot of the scores for the affinity category 'Travel' versus time, for the user that is the subject of FIG. 9.

By way of example FIG. 9, already mentioned above, represents user affinity profiles for a particular user for weeks 29, 30 and 31 overlaid on a single plot. FIG. 18 is a plot of the scores for the affinity category 'Travel' versus time, for the user that is the subject of FIG. 9. It can be seen that there is a steep increase in interest in Travel followed by a plateau. This indicates strength of intent on the part of the user, and enables the targeting of this user, who has a notable increased interest in travel-based content, with travel-related advertising, offers or other content.

The determination of such intention, for example to purchase, to act, to vote can be of particular benefit in some contexts For example, commercial advertisers place adverts on TV to sell something (and many will also look to develop brand awareness as a proxy for future purchase intentions), public bodies use advertising to communicate and inform, and political organisations attempt to influence and garner votes. In all cases, the 'state' of the audience is likely to have a material effect on the desired outcome. Regardless of relevancy, if the audience is in a 'buying' mindset for a particular product, service, concept or message—an intention to purchase—then that audience will be much more valuable to an advertiser, public body or political organisation or other operator or third party, than one that is more inert (and therefore more difficult to convert). Third party data suppliers usually attempt to collect intent data through surveys and then re-sell this to relevant advertisers or other interested parties at a considerable premium; a little like 'red hot leads'.

For avoidance of doubt, 'intent' is not necessarily the same as 'target'. The latter is an audience selection predicted to be relevant to the offering or communication ('Sports fan', 'Pet Owner' etc). Intent is a far more specific sub-set of an audience that is in a state of consideration or pre-purchase research.

However, unless a consumer, citizen or voter has volunteered the information that they are 'in market', the challenge is how, based on behavioural data alone, to determine when members of a target audience might be in the ephemeral state of 'intent'.

In-Market audiences in some embodiments are segmented by 21 purchasing/intent categories (for example, from Arts & Crafts to Travel) in the present embodiment, or any other suitable number of categories in other embodiments. A table of Intention segments according to the present embodiment is provided in FIG. 19. Affinity audiences have 12 segments in the present embodiment (or any other suitable number of categories in other embodiments) and, interestingly categories such as Banking & Finance and Politics only appear in this audience type. Beneath these categories in both Audience types are many pre-defined audience sub-sets. For example; In market->Cars & Vehicles->Motor vehicles->By type/Brand/New/Used According to some embodiments, intent may be derived from viewing data. One signal for intent is a change in behaviour. Viewing behaviour may, therefore, offer many possible triggers and signals that could be captured to predict a household or individual in an 'intention' state. The examples below are not meant to be definitive or limiting, and are merely illustrations of how viewing data changes might signal a move into a new intention state that could be valuable to parties such as advertisers, public bodies, political organisations or other interested parties:

- Example—a household starts viewing travel programmes or programmes associated with one country [proxy for holiday/flight purchase]
- Example—an individual's viewing to the motoring genre increases significantly [proxy for car purchase]
- Example—start of viewing in the Cooking genre or sub-set (eg baking) [New or renewed interest in food/cooking/eating out]
- Example—start of viewing of children's programming [Newborn]
- Significant change in genre mix viewed [proxy for change in HH composition and household purchasing]
- Start or stop watching a particular news programme [e.g. signal of political shift?]
- Newly watch more at certain parts of day [change in household circumstances; e.g. redundancy, retirement?]

In the embodiment of FIG. 1, the affinity profile module 26 is configured to determine intent, for example for the purposes discussed above, based on the user records and/or affinity profiles for the users. In other embodiments, a separate intent module may be provided that determines intent based on the user records and/or affinity profiles for the users, or the intent module can be included in the affinity profile module 26. The intent module and/or affinity profile module can include classifier and/or trained machine learning model or algorithm or other processing logic that can take as input the user affinity profiles, or affinity profile changes or profiles at multiple time points, and output an intent score that represents likelihood of intent to perform a corresponding action. The classifier and/or trained machine learning may be trained on training data sets comprising affinity profiles for a plurality of users and data representing actions subsequently taken by the users, or indicated by the users as intending to be taken. Thus, the model may be trained to determine likely actions or intentions based on affinity profiles for users. In other embodiments any suitable algorithm or process may be used to map affinity profiles to intention to act.

The affinity profile module 26 and/or dedicated intent module can compare the intent scores for each user to a threshold and/or can monitor changes in the intent score for users over time, and can select users that are likely to perform the selected action if the score exceeds the threshold, or if the score shows at least a specified amount or rate of increase. Any other suitable processing of intent scores can be performed to select users that are considered likely or unlikely to perform a specified action.

It is a feature of the system of FIGS. 1 to 4 that affinity profiles can be produced for very large numbers of users. Each user profile may be unique, as it may include user-specific scores over multiple affinity categories, potentially many different affinity categories, and each user affinity profile can potentially vary with time. In some cases, affinity profiles are determined based on user actions for long time periods, for example months, or affinity profiles can be determined for shorter time periods and changes in affinity profiles can be monitored over time.

It is a feature of the system of FIG. 1 that the affinity profile module 26 can include a segmentation module that segments users based on their affinity profiles. For example, even though each user may have a unique affinity profile, it is possible to segment users into specific segments based on their affinity profiles. The segmentation module may be provided as a component separate to the affinity profile module in some embodiments.

The segmentation module, for example included in the affinity profile module, is configured to obtain affinity profiles for a plurality of users and to categorize each user into one or more of a plurality of user segments based on their affinity profile.

At least some of the user segments may for example represent at least one of: an area of interest or a combination of areas of interest, a demographic category; an amount of viewing or other consumption of content; a time period when consumption of content is most likely. Each user is assigned to at least one segment or to a plurality of segments.

In a simple example, all users with an affinity category score over a threshold amount for the category Sports (or another selected category) may be selected to be included in a user segment (which may be referred to as an audience segment depending on context) of Sports Enthusiasts (or other segment). In other examples, identification of a segment of users may be based on a combination of affinity category scores included in the affinity profiles for the users. For example, scores higher than particular thresholds for some categories and/or lower than particular thresholds, or based on sum of scores across multiple categories of relevance, or based on any other suitable logic or algorithms.

In some embodiments, the affinity profiles for the users, for example affinity category scores for relevant categories included in the profiles, may be used as inputs to a trained machine learning model to determine which users should be included in a particular segment. The training of the machine learning model depends on the definition of the segment. For example, in the Sports Enthusiasts example a machine learning model could be trained on affinity profiles of users and subsequent viewing behaviour of users to train the machine learning model to identify users with affinity profiles that suggest they are likely subsequently to watch sports-related content. It may be found, for example, that scores across a whole range of different affinity categories may be relevant, to a greater or lesser degree, to whether a user is likely subsequently to view sports content. The training does not have to be based on viewing of a specific type of content, and any selected user behaviours could be used to train the model.

The segmentation of users can be performed to segment users into a plurality of standard or pre-defined segments. For example, the operator of the affinity profile and recommendation system 2 may make available a standard set of pre-defined user segments to customers or other third parties. In some embodiments, a segment may be defined by a customer, operator or other party for a particular purpose based on affinity profiles for the users.

For example, a segment could be defined that represents users that are most likely to consume a selected item of content, or type of content, for example a particular TV programme or type of TV programme or that are most likely to consume content during a selected time period, or perform some other action. Alternatively or additionally, a standard or pre-defined set of user segments may be created and one of the segments or a combination of the segments that best correspond to users that are most likely to consume a selected item of content, or type of content, for example a particular TV programme or type of TV programme or that are most likely to consume content during a selected time period, or perform some other action.

The segmentation module may, for example, be configured to determine a bespoke user segment for a selected item of content based on metadata associated with the selected item of content, and assigning users to the bespoke user segment based on at least the affinity profiles of the users.

Exploring changed viewing data (for example, in some cases, combined with account and transaction data) to uncover useful predictors of intent can be valuable. Intention data has high temporal value and would require high velocity attribute creation and availability, combined with an advertising trading model that operates with the flexibility to offer and fulfil intention-propensity audiences. The data also generally is segmented into useful segments (e.g. suitable attributes or combinations of attributes, or segments derived from attributes) for this purpose, such as the segments illustrated in FIG. 19. In some embodiments, there is the option for an interested party, such as an advertiser etc, to create or define customer intent audiences, for example based on combinations of segments and/or attributes that of interest to the interested party. Thus, bespoke intent segments may be defined, and the system can be used to determine users that fall into the intent segments of interest, for example at a particular point in time, based on their actions e.g. based on their user record.

The system may be configured to identify occurrence and/or probability of a past or future life event or change in circumstances of a user in response to a change in the affinity profile and/or user data of the user, thereby identifying occurrence or probability of a life event or change in circumstances of a user based on change in television viewing or other activity.

A piece of additional television content, for example advertising content, may be pushed to the user based on the identification of the occurrence or probability of a life event or change in circumstances of a user.

By way of example, the life event or change in circumstances may comprise one or more of a marriage, engagement, birth, death, change in employment, house move or other change in residence, intention to travel, beginning or ending of personal relationship.

Discussion above in relation to embodiments of FIGS. 1 to 4 has referred to users and user records. In some cases, each person will have a unique user identifier and a user corresponds to such a single individual. More commonly, a user refers to a subscriber to an account, for example an account with a TV service provider, and there may be either a single individual or multiple individuals who use the same account. For example, a household may have a single subscriber account and may consist of multiple individuals, for example a family. The term user in that case may correspond to the subscriber account, for example corresponding to a household rather than a single individual, in some embodiments.

According to embodiments, the user affinity profiles may also be used to determine information concerning number and type of individuals that use a subscriber account, for example household composition. In the embodiment of FIG. 1, the affinity profile module 26 includes a composition determination module that is configured to determine household composition or composition of any other groups of users that use a single subscriber account, based on affinity profiles of users and/or other user data. The composition determination module may be provided as a component separate to the affinity profile module in some embodiments. It can be understood that in some embodiments reference to household composition can also refer to, or be replaced by, composition of any other groups of users that for example use a single subscriber account.

The composition determination module in some embodiments determines household composition based on the affinity profile for the user account associated with a household.

The household composition determination can be, for example, a determination of whether the household consists of more than one person or the number of people forming the household. For example, determining the household composition can comprise a determining whether the household comprises at least one child.

In some modes of operation the determination of household composition comprises determining from the affinity profile whether the household includes at least one of a toddler; pre-school child; school-age child; university or college student; pensioner; working adult; unemployed person; stay-at-home adult; pensioner; and/or one or more other specified demographic or economic categories.

In some modes of operation the determination of household composition comprises determining from the affinity profile what languages are used, for example what languages are used by one or members of the household in viewing content. In some cases, languages are mapped to particular individuals within the household based on the affinity profile.

In some situations, where there are a plurality of user accounts associated with a household, the method comprises determining a respective affinity profile for each of the plurality of user accounts or determining a combined affinity profile based on the plurality of user accounts, and the determining of household composition is based on the combined affinity profile or on the plurality of affinity profiles.

The composition determination module can include a classifier and/or trained machine learning model or algorithm or other processing logic that can take as input the user affinity profiles, or affinity profile changes or profiles at multiple time points, and output household composition data that represents likely household composition or at least one aspect thereof. The classifier and/or trained machine learning may be trained on training data sets comprising affinity profiles for a plurality of users and/or households and data representing corresponding household composition for those users and/or households. In other embodiments any suitable algorithm or process may be used to map affinity profiles to household composition.

Figure 20:
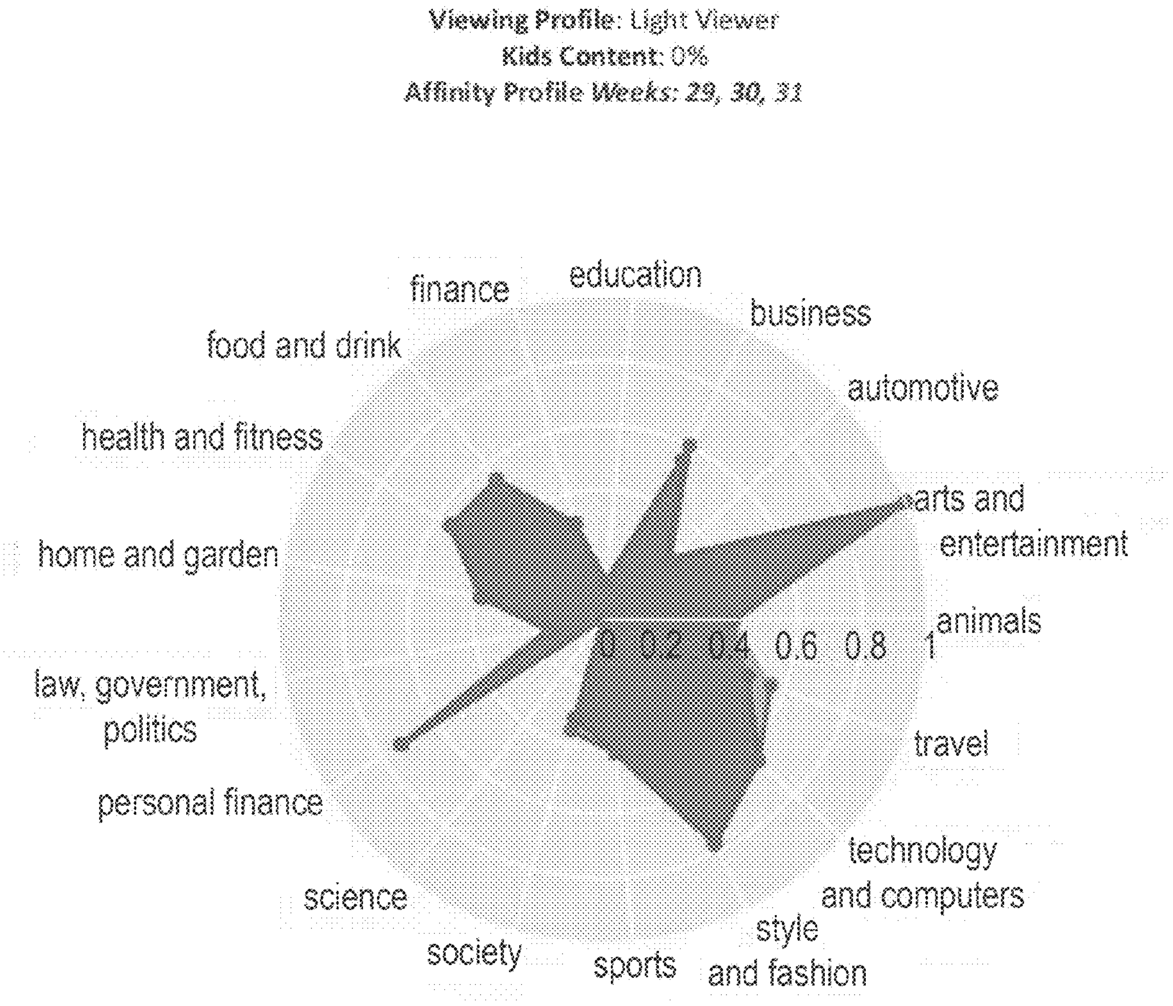
FIG. 20 is a representation of an affinity profile for a user.
Figure 21:
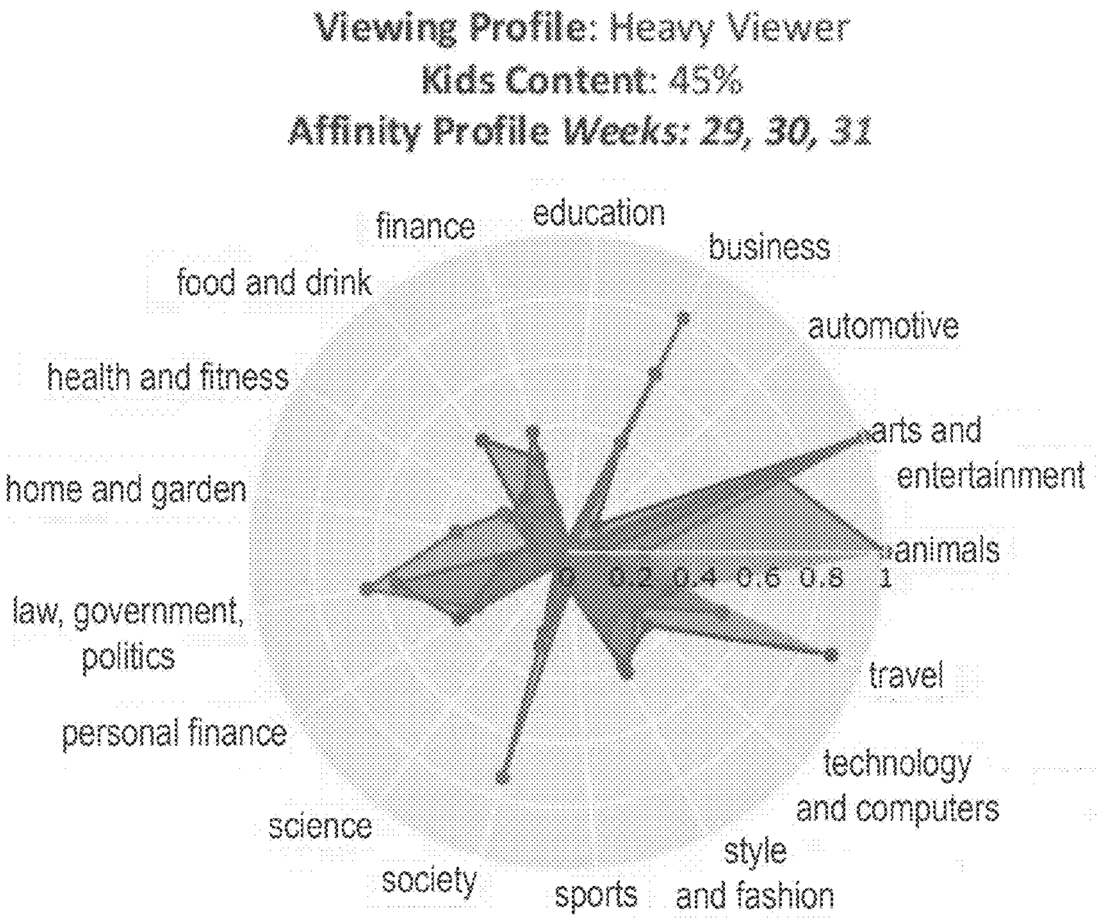
FIG. 21 is a representation of an affinity profile for a user.
Figure 22:
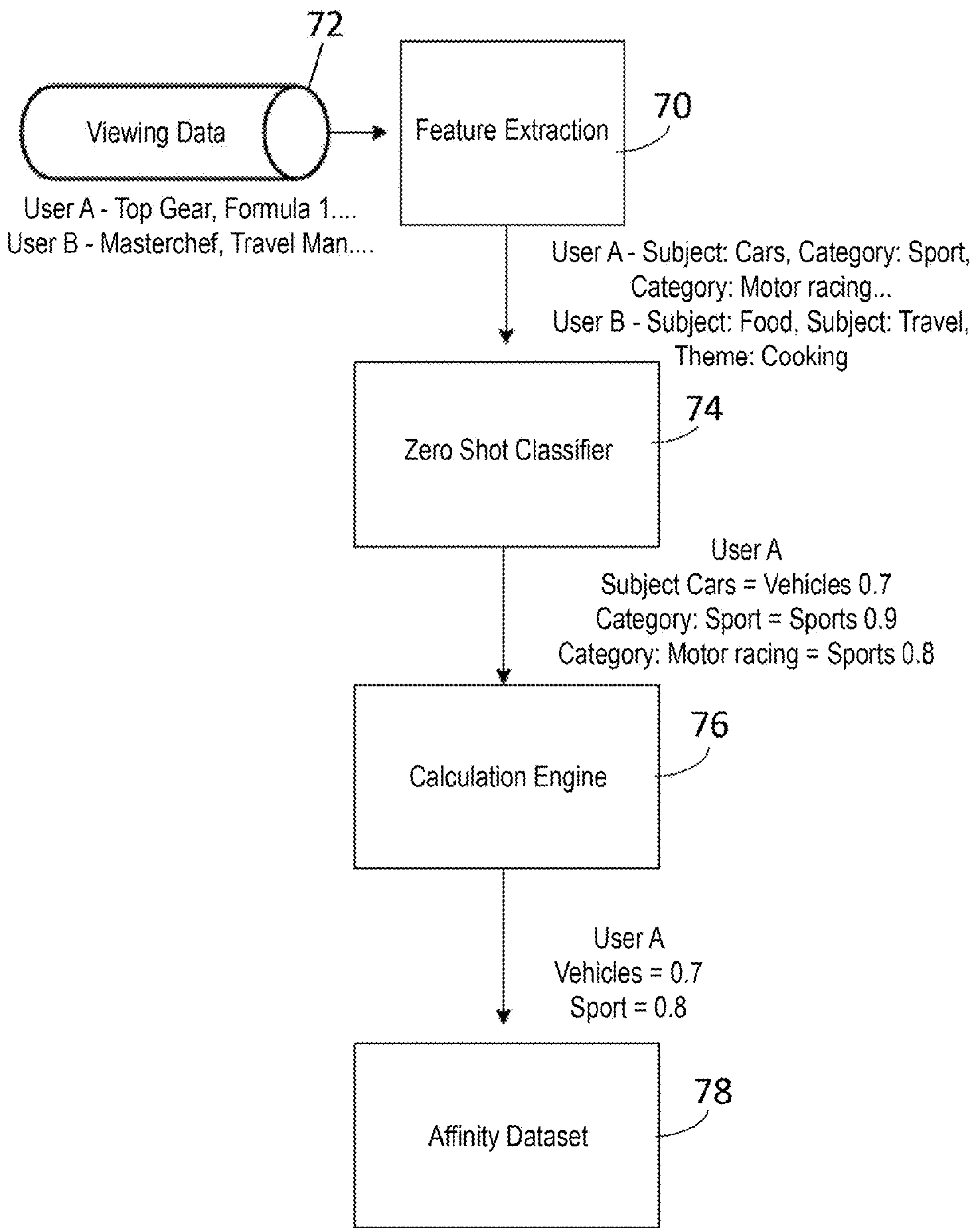
FIG. 22 is a flow chart showing in overview use of a zero shot classifier in an affinity profile generation.

By way of example, FIG. 20 shows affinity profiles for a user (in this case a single subscriber account) for three week-long periods (weeks 29, 30, 31). The profile shows that no children's content was consumed by this user, that there were consistent trends week by week, that the user showed predictable behaviour with no contrasting viewing patterns, and that the user consistently engaged in Arts and Fashion content. The user is also classified by the system as a "Light Viewer" based on the amount of content that they view or otherwise engage with (it is a feature of some embodiments that the affinity profile module 26 or other component of the system is configured to classify users as light or heavy users based on the amount of content they view or otherwise consume). In this embodiment, the affinity profile module 26 applies at least one rule, and/or applies a trained model, to determine that the user that is the subject of FIG. 21 is a single-individual household, based on the amount, type and consistency of viewing as represented by the affinity profile.

In another example, the system in at least some embodiments is configured to determine, for example automatically, the composition of multi-individual households or other subscriber accounts used by multiple individuals. For example, FIG. 21 shows affinity profiles for a user (in this case a single subscriber account) for three week-long periods (weeks 29, 30, 31). The profile shows 45% of household viewing was children's content, with no obvious trends and sharply contrasting viewing patterns. The user (e.g. subscriber account) is also classified by the system as a "Light Viewer" based on the amount of content that they view or otherwise engage with. In this embodiment, the affinity profile module 26 applies at least one rule, and/or applies a trained model, to determine that the user that is the subject of FIG. 21 is a single-individual household, based on the amount, type and consistency of viewing as represented by the affinity profile.

In some embodiments, as well as determining the nature of a user or household, the user affinity module 26 is configured to split the affinity profile for a user (e.g. subscription account) into affinity sub-profiles each associated with a respective individual or individuals that are determined to be associated with the user (e.g. subscription account). For instance, in the example of FIG. 21, in response to determining that the user is a family household, the affinity profile module 26 may, either automatically in response to instructions, generate a set of affinity sub-profiles, one being an affinity profile for a first adult, one being an affinity profile for a second adult and one being an affinity profile for all children in the household configured together. The affinity profile module 26 used a further trained machine-learning model, or other suitable algorithm to determined such sub-profiles.

Similarly, the user affinity module 26 is configured to determine affinity sub-profiles for different times of day (e.g. morning, afternoon, evening) or days of week or other time periods, based on the overall affinity profile determined for a particular user (e.g. a particular subscriber account).

Any other suitable categorisation of users based on their affinity profiles and, optionally other properties, is performed by the affinity profile module 26 or other processing component in other embodiments. For example, a user can be categorised into one of a plurality of categories based on the user activity and/or affinity profile. By way of example, the plurality of categories may comprise at least one of demographic categories, multi-user household, household with or without children, household with children in specified age range(s), employed or unemployed, daytime viewers, evening viewers, all-day viewers or other time-dependent viewing category, heavy viewers or light viewers, viewers of content in specified languages.

In some embodiments, the system of FIG. 1 is configured to determine a measure of likely or actual engagement by users advertising or other additional content. Humans do not view TV with full attention. Even if content is compelling, the human brain will switch in and out of focus and attention. Much of broadcast TV is consumed as background. If this is problematic for programme makers and channel/platform operators, it is even more so for advertisers. Hence, the attraction (at significant increased cost) of getting first-in-break in a linear broadcast advertising lot and the creative challenges of messaging using skippable preroll advertising.

In some embodiments, the affinity profile module 26, or other processing component of the system, is configured to identify and categorise engagement of users, based on learning and viewing data alone, for example based on the user records and/or affinity profiles generated for the users. In addition, a TV operator's account and transaction data can be used to supplement the user record and/or affinity profile for each user to determine a values for an engagement parameter (for example, an engagement attribute) for each user. The engagement attribute may be included as an attribute in, or in determining, the affinity profile for a user in some embodiments.

Description of embodiments of FIGS. 1 and 3 above have referred to user actions in relation to television programmes available from a television content provider. Examples of television content providers, purely for illustration purposes, include for example the BBC (e.g. via iplayer (RTM)) or Sky (RTM). Thus, for example user affinity profiles may be generated from user actions with respect to one of those television content providers, for example user actions in selecting and viewing content via an electronic programme guide (EPG) or other interface of the television content provider in question (e.g., purely by way of example, user actions performed using the iplayer (RTM) interface).

In some embodiments, the user activity used to determine affinity profiles may comprises selection, viewing or other actions in relation to items of television or other content from a plurality of different television or other content providers accessible via a single electronic programme guide (EPG) or other user interface.

In other embodiments, the user activity used to determine affinity profiles may comprise selection, viewing or other actions in relation to items of television or other content from a plurality of different television or other content providers accessible via a plurality of respective electronic programme guides (EPG) or other user interfaces. For example, a set top box or other device associated with a user, for example associated with a subscriber account, may have a user interface that provides multiple EPGs each associated with a respective television or other content provider. In some embodiments, the user record, and thus affinity profile may be determined based on actions in respect of all of the television or other content providers, or a selection of the television or other content providers, or a single one of the television or other content providers. In some embodiments, different affinity profiles may be generated for the same user, in respect of their actions in relation to different ones of the content providers.

In some embodiments, the user may have multiple devices and user actions across the multiple devices may be used to determine the affinity profile. By way of example, the same subscriber account may be accessed using a set top box, a mobile device, a laptop or desktop computer, or other device. Where the user has an associated plurality of user devices and/or a user account, the user record and/or affinity profile may be generated based on activity using the plurality of user devices and/or the user account in some embodiments User attribute profiles have been shown in various figures in respect of actions during week-long time periods. Any other suitable time period may be used, optionally a rolling time period, and the system may be configured to update the user's affinity profile periodically or continuously. For instance, in some embodiments affinity profiles may be updated daily or weekly. A user may be assigned to different group(s) of user in response to a change in their affinity profile.

As mentioned above, it is feature of some embodiments of the system that the attribute profile module 26 can provide outputs configured to be used directly by digital advertising or other systems, for example in the form of reports or files in suitable formats. In some embodiments, an API and/or an operator interface can be provided that enables user of a digital advertising or other external system to access and/or request and/or manage user attribute profiles or sets of user attribute profiles, or reports, from the attribute profile module 26 or other component of the system.

The digital advertising or other external system can use the attribute profiles of the users to select users or groups of users to receive additional items of television or other content, for example advertising content.

Any suitable techniques may be used by the external system to select users or groups of users, and to match them to items of content, for example advertising content. In some embodiments such system, for example such processing resource, is not external but instead forms part of the system of FIG. 1.

As mentioned above, it is a feature of some embodiments that the affinity profile module 26 or other component of the system is configured to classify users as light users or heavy users based on the amount of content they view or otherwise consume over a period of time.

The affinity profile module 26 may, for example, target users based on content consumption, by for each of a plurality of users, monitoring user activity including identifying content selected for viewing by the users, obtaining metadata concerning the selected items of content, the metadata representing at least some properties of the selected items of content, generating or updating the user record for the user, the user record comprising or representing the user activity and/or the associated content metadata; and identifying users that have below a threshold level of user activity.

As discussed, the affinity profile module 26 processes the user record of each user to generate an affinity profile for the user based on the user record, the affinity profile comprising at least one selected affinity category or affinity category score.

In some embodiments, the affinity profile module 26 may, if desired, select items of content that are expected to be attractive to at least some of the users identified as having below a threshold level of user activity (e.g. light users) wherein the selecting of items of content is based on the affinity profiles for the users.

The selection is performed by a selection module, which may be included in the affinity profile module 26, or may be provided separately. The selection module can be configured to select items of content for which to include advertisements as part of an advertising campaign for a product or service thereby to target at least a sub-set of a desired target audience of the users for the advertisements. The affinity profile module 26, or the dedicated selection module, may determine at least some of the users that are identified as having below a threshold level of user activity (e.g. light users) and thus who may be expected not to view the first items of content, may select second items of content that are expected to be attractive to at least some of the users identified as having below a threshold level of user activity, wherein the selecting of items of content is based on the affinity profiles for the users.

The affinity profile module 26, or a dedicated selection module may, alternatively or additionally, use user segments (for example user segments as determined using techniques described herein) to select first items of content within which to include advertisements as part of an advertising campaign for a product or service thereby to target a selected user segment for the advertisements. The affinity profile module 26, or the dedicated selection module may determine at least some of the users of the user segment that are identified as having below a threshold level of user activity (e.g. light users) and thus who may be expected not to view the first items of content, and may select second items of content that are expected to be attractive to at least some of the users of the selected user segment identified as having below a threshold level of user activity, wherein the selecting of items of content is based on the affinity profiles for the users.

At least some of the user segments represent at least one of: an area of interest or a combination of areas of interest, a demographic category; an amount of viewing or other consumption of content; a time period when consumption of content is most likely This categorising of users based on their rate of viewing or other consumption of content, for example classification into light, medium, or heavy viewers or any other suitable category, and then targeting them based on such categorisation and based on their affinity profiles can be particularly useful in certain contexts.

For example, in the context of advertising, an advertiser may wish to maximise the exposure of an advertisement to a desired audience or audience segment. The audience could for example be selected based on their affinity profiles. However, some parts of the desired audience segment may, for example, be light viewers and so even if advertising is targeted to be output with content (e.g. a television programme) that is likely to be viewed by a large audience and/or a desired audience segment, there may be light viewers who are unlikely to view the advertisement because of their overall habit of viewing little content. The ability to identify such light viewers can enable, for example, them to be targeted with the advertising in question based on their affinity profile. For example an advertising slot may potentially be purchased to target such light viewers by targeting less expensive slots for less popular programmes that are nevertheless likely to be attractive to some of the light viewers based on their particular affinity profiles. Thus, gaps in advertising exposure for a particular advertising campaign may potentially be filled in.

By way of a specific, simplified example, in determining an advertising campaign for, say, football equipment, the system of the embodiment could be used to identify a sports enthusiast segment of say 10,000 viewers. It could then be determined that for example 2,000 were light users, 6,000 were medium viewers, and 2,000 were heavy viewers. The output from the system could then be used to target, say, the light viewers based on affinity profiles for those users, and advertising slots could be purchased in relation to programmes or other content that the light users may be likely to view based on their specific affinities. The medium and heavy viewers may be easier to target by selecting potentially less user-specific advertising slots, for example using known approaches, as such medium and heavy viewers may be viewing so much content in any event.

In some embodiments, heavy and medium users within a targeted segment of users could be targeted with a particular piece of advertising or campaign merely by including it in a popular programme or time slot that they are highly likely to watch. Potentially, light users could be targeted by ensuring that whatever content they consume, e.g. programme they watch, the advertisement will be inserted at least once. This and other bespoke approaches that differentiate between light and heavy viewers can be taken in some embodiments.

In some embodiments, all users within a segment that is intended to be targeted by an advertisement are selected such that the user will be targeted with the advertisement in response to detection that the user is watching content. Thus, the advertisement could be included in different content for different users of the segment, depending on what content the different viewers are watching. Thus, it can be made certain that the advertisement is viewed by all users of the desired segment, regardless of whether light or heavy viewers. This approach requires real time monitoring of actions of all users of the segment, for example by the affinity profile module 26 or other component, such that the advertisement can be inserted as and when each user is actually watching content.

The user categorisation and the affinity profiles can be used to select content (e.g. a television programme) or select a time window in which to included advertising, and/or to select users or groups of users to receive the advertising (for example, some users could be selected such that whatever they watch or consume the selected piece of advertising is provided to those users). Alternatively it can be used to select the advertising that is likely to have the most impact if selected to be included in a particular time slot or item of content, based on the affinity profiles of the users likely to be viewing that item of content or during that time slot.

As mentioned above, the system of the embodiment of FIGS. 1 to 4 can be used to obtain affinity profiles for users, and to segment the users based for example on the affinity profiles. As already discussed, such affinity profiling and segmenting can be performed for very large numbers of users, potentially into the millions, and if desired can be performed without access to demographic or other personal information concerning the users and whilst maintaining user anonymity. Thus, the system can be highly responsive and can profile users based on their interests using only actions relating to content, for example television content. Thus, issues relating to unreliability, consistency and availability of demographic data or other user personal data, as well as issues relating to maintenance of personal privacy, can be addressed whilst still obtaining accurate profiling of user affinities, potentially updated in real time, and in some cases even based on small amounts of user data, for very large numbers of users. This is particularly significant in the context of content distribution systems with large numbers of users, which are technically demanding environments with content and user interactions occurring in real time and with low tolerances, and where any improvement in data processing and in accuracy of assessment of user behaviours and interests can have significant technical impact.

The affinity profiles and segmentation of users based on such affinity profiles can be used for a range of different purposes. As mentioned, accurate affinity profiles and/or segmentation of users can be particularly useful in targeted advertising, for example in choosing programmes or other content and/or time slots and/or users or user segments to target with a particular advertisement or advertisement campaign, or in selecting which advertising to user in a particular programme or other content, or in a particular time slot. More generally, the affinity profiles and/or segmentation of users based on such affinity profiles can be used to select content to be provided, promoted or pushed, for example to particular users, groups of users or in particular time slots. The affinity profiles and segmentation of users based on such affinity profiles can also be used to determine intention to act of users or groups of users, and to take actions based on such determined intention to act. The affinity profiles and/or segmentation of users based on such affinity profiles can even be used in resource management and/or operation of a content distribution system itself, as they can be used in predicting for example content consumption, use of the content distribution system and other actions by users, which can assist in managing system resources, for example memory or bandwidth resources or other resources.

Returning to selection features, amongst other things, the system of FIG. 1 may be configured to use the affinity profiles and/or the segments based upon the affinity profiles to select items of content, or time periods, and/or users or user segments for inclusion of a particular item advertising or other content, and/or to select an item of advertising or other content to be included in a particular time slot, or associated with a selected item of content and/or to be pushed to a particular user or group of users.

Selection features can be implemented by the selection module, as already discussed, which can be configured to perform various selection processes in various embodiments.

The selection module can include a classifier and/or trained machine learning model or algorithm or other processing logic that can take as input any one or more of the user affinity profiles, affinity profile changes, or profiles at multiple time points, or user segments, and output selections, for example selections of users or groups of users, items of content, advertising content, types of content and/or time slots. The classifier and/or trained machine learning may be trained on training data sets comprising affinity profiles and any other data relevant to a selection for a plurality of users. In other embodiments any suitable algorithm or process may be used to map affinity profiles to household composition.

In some embodiments, the selection module (which may be part of the affinity profile module 26) monitors consumption of items of content or other activity of the users for different time periods, and determines the likelihood of, or an expected audience measure for, a selected item of content being consumed during the or each selected time period based on the affinity profiles and the monitored consumption of content or other activity for the different time periods.

In some embodiments, the selection module is configured to determine the types of people watching at certain time of day, for example whether they are likely or not to be within a particular user segment (e.g. a user segment determined based on affinity profiles) or other category of user. For example, if a segment has been defined based on an interest in, say, budget family holidays then the selection module can operate to determine the likelihood of members of that segment watching TV or consuming other types of content at a selected time of times of day. By way of another example, the selection module may be used to determine what kind of audience segments watch content (any) at say, 11-12 on Tuesday or during any other time period?

The operations and enquiries performed by the selection module, and the other modules and components of the system, may be pre-programmed and/or may be selected or controlled by an operator of the system. Any suitable operator interface may be provided, for example a workstation, suitably configured laptop, desktop or other computing device, or a web-based interface with which an operator can control operation of the system, for example the system of FIG. 1.

The determining of likelihood of, or the expected audience measure for, a selected item of content being consumed during the or each selected time period is determined by the selection module based on the segments to which the users belong and on the monitored consumption for different time periods in some embodiments. The monitoring of consumption of items of content or other activity of the users can be performed using the user records of the users in some embodiments.

The determining of the likelihood of, or the expected audience measure for, the selected item of content being consumed during the or each selected time period comprises providing the affinity profiles, user records and/or the monitored consumption to a machine learning model that is trained to output a likelihood of, or the expected audience measure for, the selected item of content being consumed. The time periods may be time windows during a day and/or days of the week.

The selection module and/or affinity profile module may monitor consumption of selected items of content of the selected type to determine which of the users consumed the items of content of the selected type, and then determine an audience that is expected to consume the items of content of the selected type based on the affinity profiles and/or affinity profile segments of the users that were determined to have consumed the selected items of content.

The selected content item type can, for example, comprise at least one of a selected genre of television programme, movie or other audio-visual content; a selected genre of computer game; a selected genre of music; a selected genre of books, music, spoken word content, other audio content, newspapers, or magazines; and/or television programmes, movies, other audio-visual content, computer games, music, books, spoken word content, other audio content, newspapers, or magazines with at least one selected property.

The determining of the audience for the selected content item type comprises providing the affinity profiles and/or user records of the users determined to have consumed the selected items of content of the selected type as inputs to a machine learning model that is trained to output an audience based on the affinity profiles and/or user records of the users.

The selection module can also be configured to determine an audience that is expected to consume the selected item of content based on the affinity profiles of the users and/or the segments to which they belong.

The selection module can be configured to, or the output of the selection module can be used to determine expected audiences for a plurality of items of content for which to include advertisements as part of an advertising campaign for a product or service thereby to target at least a sub-set of a desired target audience for the advertisements.

The determining of the audience for a selected item of content can include for example providing the affinity profiles and/or user records of the users as inputs to a machine learning model that is trained to output an audience based on the affinity profiles and/or user records of the users.

The system or external system may, for example, comprise identifying items of television content that are correlated with particular affinity categories. The system or external system may be configured to receive at least one property of a piece of additional content and to select a plurality of users from a group of the users to receive the piece of additional content based on the affinity profiles of the users. The at least one property of the piece of additional content can comprise a set of tags or other metadata representing properties of the piece of additional content. The pushing of the pieces of additional television content may be co-ordinated so that it is pushed for the same period during or between television programme viewing. The system and/or the external system may be configured to select a piece of additional television content, determine at least one property of the piece of additional television content, and select a group of users to receive the piece of additional television content based on matching the at least one property to affinity profiles of the users. The selecting of the group of users to receive the piece of additional television content may, for example, be based on both the matching to affinity profiles and on geographical location or other property of the users. The matching in some embodiments is performed using a trained machine learning model.

The additional content can, for example, comprise advertising content and may be distributed to users so that they are forced to watch or otherwise consume the additional content and/or so that a device associated with the user is forced to display or otherwise output the additional content. The additional content may, for example, be displayed on the user device between items of selected content, or between parts of an item of selected content. The identifying of the television content selected for viewing by the user comprises identifying individual items of video-on-demand (VOD) content and/or identifying selected TV channels and/or the programmes being broadcast on the selected TV channels.

In some embodiments, the system or external system may be configured to monitor for response to a piece of additional content by the user or group of users to which it is provided, for example monitoring user action during viewing of the piece of content and/or monitoring for a future purchase, engagement or correspondence by the user(s). The system be configured to train or update the or a machine learning model based on the monitored response.

Although description has been provided of using affinity profiles to select additional content, for example advertising content, the affinity profiles can be used in a variety of different ways in embodiments. For instance, a television service provider, or network operator or other provider may use the set of affinity profiles for their users to predict total user viewing or other actions of their users for future time periods, given their programme schedule or roster of VoD content and/or external events. This may be used, for example to predict or monitor network or other resource usage or capacity. Geographical hotspots for viewing of particular programmes may be determined in some examples. In one example, if the users (e.g. subscribers) for a television service operator had, overall, a large number of users with a high interest in watching sport, based on their affinity profile, then the television service operator may be able to predict a high demand for their users in response to streaming live coverage an important football match or other live sports event. The use of affinity profiles in predicting future demand may provide a particularly sensitive and user-specific approach to predicting demand.

FIGS. 23 to 30 are flow charts showing in overview methods that are performed by the system of any of FIGS. 1 to 4 in certain embodiments, for example as described above.

Various description has been provided of content in the form of television programmes, and a user interface in the form of an electronic programme guide (EPG). Any suitable type of content can be used in some embodiments, and any suitable type of interface may be provided. For example, the user devices may provide a user interface that enables selection and/or consumption of one or more of television programmes, movies, computer games, books, music, spoken word content, other audio content, newspapers, or magazines. In some embodiments, for example, an EPG may be provided that allows selection and viewing/playing of television programmes, movies and computer games. For example, some channels or carousels on the EPG may provide television programmes and/or movies and some may provide computer games. The description herein relating to content encompasses any suitable types of content, or combinations of types of content, including those described in this paragraph.

Although various specific examples have been described above, these are provided to help understanding of the present disclosure and other possible implementations can be used. For example, although specific arrangements of systems and networks that could be used to implement the concepts disclosed herein are shown in the figures, other systems architectures could be used.

Method steps described herein can for example be performed by, and/or modules described herein can for example be implemented in the form of, one or more programmable processors executing a computer program to perform functions of the invention by operating on input data and generating output. Method steps described herein can also for example be performed by, and/or modules described herein can also for example be implemented in the form of, special purpose logic circuitry, e.g., an FPGA (field programmable gate array) or an ASIC (application-specific integrated circuit) or other customised circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user or operator, the invention can be implemented with a user device 40 or operator interface having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

Various embodiments include trained machine learning models, which may be implemented as one or more machine learning modules. For example, the machine learning module(s) may implement at least one machine learning model that has been trained on training data. As examples, the machine learning model may comprise a KMeans, Kohonen, or Naïve Bayes machine learning model, and/or may comprise a neural network, for example a convolutional neural network (CNN). The machine learning model may use clustering. The machine learning method may determine features commonly occurring together in content and group (e.g. cluster). The machine learning model may be a supervised or unsupervised learning model. The machine learning model may be updated or trained based on user feedback.

According to certain embodiments, there is provided a method of determining affinity profiles, comprising:

for each of a plurality of user devices, monitoring user activity including identifying television content selected for viewing by the user;

obtaining metadata concerning the selected items of content, the metadata representing at least some properties of the selected items of content;

generating or updating a user record for the user, the user record comprising or representing the user activity and/or the associated content metadata;

processing the user record to generate an affinity profile for the user based on the user record, the affinity profile comprising at least one selected affinity category or affinity category score, wherein the affinity categories are selected from a stored set of affinity categories, each representing a user's affinity for a respective subject area.

The method may be, or form part of, a method of providing content, for example television content, to each of a plurality of users of a content distribution system, for example a television distribution system, wherein the content distribution system is configured for connection to the plurality of user devices, each user device configured to display an electronic programme guide (EPG) or other user interface that is operable by a user to select one or more items of television or other content. In response to the selections the distribution system may be configured to distribute the selected items of television content or other content to the user device for viewing by the user during content viewing sessions.

The content may comprise, for example, games, news, radio, podcasts, recordings, free ad-supported tv, or any other suitable audio, visual, or audio-visual content as well as or instead of scheduled or on-demand television content.

The affinity profiles may be used to select additional content, for example additional television content, to push to the user based on the determined user affinity profile, thereby enabling profiling and pushing additional television content to a user based on the user's television content selections.

The generating of the affinity profile may comprise applying a trained machine learning model, for example to the user record, the trained machine learning model for example being trained to output an affinity profile based on the user record.

According to certain embodiments, there is provided a method of applying a trained machine learning model to a user record that represents content selection and/or viewing by a user thereby to generate an affinity profile for the user. The trained machine learning model may be trained to output an affinity profile based on the user record.

The machine learning model may comprises or uses a text classifier that is operable to receive text input relating to television content, or other content, as part of the user record and to output the affinity profile.

The text classifier may comprise a zero shot classifier that may provide for data classification based on text labels that were not used to train the model.

The generating of the affinity profile may be independent of, or can be performed without taking into account, data representing socio-economic or demographic status of the user. The or each user, or at least some of the users, may be anonymous.

According to certain embodiments, there is provided a method of generating an affinity profile for a user based a user record that represents content selection and/or viewing by a user, wherein the generating of the affinity profile is performed without taking into account, and/or independently of, data representing socio-economic or demographic status of the user The selecting of the additional content, for example additional television content, may be independent of, or can be performed without taking into account, data representing socio-economic or demographic status of the user.

The user activity may comprises selection of items of content, for example television content, from a plurality of different content providers accessible via the electronic programme guide (EPG) or other user interface.

The user interface may comprise a plurality of user interfaces each associated with a respective different content provider and the user activity may comprise selection of content, for example television content, from a plurality of the different content providers and/or via the plurality of different user interfaces.

The method may comprise identifying items of content, for example items of television content, that are correlated with particular affinity categories.

The method may comprise determining a household composition based on the affinity profile for a user. The determining of household composition may comprise predicting if the household consists of more than one person, and/or the number of people forming the household, and/or the presence of children in the household.

The method may comprise determining an intention to perform an action, for example an intention to purchase, based on an affinity profile of the user or a change in affinity profile of the user.

According to certain embodiments, there is provided a method of generating or otherwise obtaining an affinity profile for a user based a user record that represents content selection and/or viewing by a user, and determining an intention to perform an action, for example an intention to purchase, based on an affinity profile of the user or a change in affinity profile of the user.

The method may comprise mapping each, or at least one, of the user affinity profiles to standard or known affinity or other categories.

The method may further comprises mapping the or each user affinity profile to a further affinity profile that is based on the standard or known affinity categories. Selecting of the additional content may be based on the further affinity profile.

The mapping from the user affinity profile to the further affinity profile may be performed by applying the machine learning model or a further machine learning model.

The method may comprise receiving least one property of a piece of additional content and selecting a plurality of users from a group of users to receive the piece of additional content based on the affinity profiles of the users.

The at least one property of the piece of additional content may comprise a set of tags or other metadata representing properties of the piece of additional content.

The method may comprise assigning each of the users to a respective group to receive a piece of corresponding additional content, for example additional television content, the pushing of the pieces of additional content optionally being co-ordinated so that it is pushed for the same period during or between television programme viewing.

The user activity and/or the associated content metadata is based on user activity for a selected time period, optionally a rolling time period, and the method comprises updating the user's affinity profile periodically or continuously.

A user may be assigned to different group(s) of users to receive additional content in response to a change in their affinity profile. The user's affinity profile may updated at least daily or at least weekly.

The method may comprise selecting a piece of additional content, for example additional television content, determining at least one property of the piece of additional content, and selecting a group of users to receive the piece of additional content based on matching the at least one property to affinity profiles of the users.

The selecting of the group of users to receive the piece of additional content may be based on both the matching to affinity profiles and on geographical location or other property of the users.

The matching may be performed using a trained machine learning model.

The user record may comprise or represent user activity for time windows, for example different time windows during a day or week, and the method may comprise generating different affinity profiles for the user for the different time windows.

The method may comprise identifying occurrence or probability of a past or future life event or change in circumstances of a user in response to a change in the affinity profile and/or user data of the user, thereby for example identifying occurrence or probability of a life event or change in circumstances of a user based on change in television viewing activity.

The method may comprise selecting the piece of additional content to push to the user based on the identification of the occurrence or probability of a life event or change in circumstances of a user.

The life event or change in circumstances may comprise at least one of a marriage, engagement, birth, death, change in employment, house move or other change in residence, beginning or ending personal relationship.

The method may further comprise monitoring of response to the piece of additional content by the user or group of users to which it is provided, wherein the monitoring of response comprises monitoring user action during viewing of the piece of content and/or monitoring for a future purchase, engagement or correspondence by the user(s).

The method may further comprise training or updated the or a machine learning model based on the monitored response.

The method may comprise categorizing a user into one of a plurality of categories based on the user activity and/or affinity profile.

The plurality of categories may comprise at least one of demographic categories, multi-user household, household with or without children, household with children in specified age range(s), employed or unemployed, daytime viewers, evening viewers, all-day viewers or other time-dependent viewing category, heavy viewers or light viewers, foreign language content viewers.

The affinity profile for the user may comprise a set of scores, each score being for a respective one of the affinity categories.

The stored set of affinity categories may comprise a plurality of sub-categories within at least some of the categories, and the set of scores may comprise scores for at least some sub-categories.

The user comprises a set of individuals, for example a household.

The user may have an associated plurality of user devices and/or a user account, and the user record and/or affinity profile may be generated based on activity using the plurality of user devices and/or the user account.

The method may further comprise displaying a graphical representation of an affinity profile for user, for example displaying a 2D or 3D graphical representation whose shape or other property is based on scores for different categories or sub-categories, optionally wherein the graphical representation comprises a dendrogram.

The method may further comprise overlaying or otherwise displaying simultaneously graphical representations of affinity profiles for a plurality of users and/or for a user(s) at different times. The additional content may comprise advertising content.

The additional content may be displayed to the user between items of selected content, or between parts of an item of selected content.

The identifying of the content, for example television content, selected for viewing by the user comprises identifying individual items of video-on-demand (VOD) content and/or identifying selected TV channels and/or the programmes being broadcast on the selected TV channels.

According to certain embodiments, there is provided a computer program product, for example a non-transitory computer-readable medium, that comprises computer-readable instructions that are executable to perform a method according to any or more of the other aspects or embodiments.

According to certain embodiments, there is provided a system comprising at least one memory that stores user records, affinity profiles and/or a set of affinity categories and a processor that is configured to perform a method according to any or more of the other aspects or embodiments.

According to certain embodiments, there is provided a system comprising a processing resource configured to:

for each of a plurality of user devices, monitor user activity including identifying television content selected for viewing by the user;

obtain metadata concerning the selected items of content, the metadata representing at least some properties of the selected items of content;

generate or update a user record for the user, the user record comprising or representing the user activity and/or the associated content metadata;

process the user record to generate an affinity profile for the user based on the user record, the affinity profile comprising at least one selected affinity category or affinity category score, wherein the affinity categories are selected from a stored set of affinity categories, each representing a user's affinity for a respective subject area.

The above description of specific embodiments is made by way of example only. A skilled person will appreciate that variations of the described embodiments may be made without departing from the scope of the invention.

The invention claimed is:

1. A computer-implemented method of using affinity profiles to determine at least one audience category that is expected to consume content, the method comprising:

obtaining, by one or more processors, affinity profiles for a plurality of users of a content distribution system, the affinity profiles comprising an affinity profile for each user of a plurality of users, wherein each affinity profile comprises a plurality of selected affinity categories and an affinity category score for each of the a plurality of selected affinity categories, and the affinity categories are selected from a stored set of affinity categories, each representing a user's affinity for a respective subject area;

monitoring, by the one or more processors and over a network, consumption of items of content or other activity of the plurality of users for past time periods;

selecting, by the one or more processors, one or more future time periods;

after selecting the one or more future time periods, determining, by the one or more processors, an expected audience measure for the selected one or more future time periods, the expected audience measure being which users of the plurality of users are expected to consume television content of any type during the one or more future time periods or during each of the one or more future time periods, the expected audience measure being determined based on the affinity profiles and the monitored consumption of content or other activity for the past time periods; and categorizing, by the one or more processors, each user into one or more of a plurality of user segments based on their affinity profile, wherein the determining the expected audience measure is based on the segments to which the users belong and on the monitored consumption for past time periods, and wherein the determining the expected audience measure comprises determining a likelihood of users belonging to a user segment consuming television content of any type during a selected time of day, the selected time of day corresponding to the selected one or more future time periods.

2. The method of claim 1, comprising:

for each of a plurality of user devices, monitoring, by the one or more processors and over the network, user activity including identifying content selected for viewing by the users of the user devices;

obtaining, by the one or more processors, metadata concerning the selected items of content, the metadata representing at least some properties of the selected items of content;

generating or updating, by the one or more processors, user records for the users, the user records comprising or representing the user activity or the associated content metadata;

processing, by the one or more processors, the user records to generate the affinity profiles for the users based on the user records.

3. The method of claim 1, wherein the item of content is provided to user devices of the users using a content distribution system, wherein each user device displays an electronic programme guide (EPG) or other user interface that is operable by a user to select one or more items of television or other content, and in response to the selections the distribution system distributes the selected items of television content or other content to the user devices for viewing by the users during content viewing sessions.

4. The method of claim 3, wherein the user interface is operable by a user to select one or more items of content of content types other than television content, the obtaining of metadata, the generating or updating of the user record, and the processing of the user record to generate the affinity profile are performed using the content metadata obtained for both selected items of television content and selected items of content of the other content types, and the other content types comprises at least one of computer games, books, music, spoken word content, other audio content, newspapers, or magazines.

5. The method of claim 3, wherein the monitoring of consumption of items of content or other activity of the users for past time periods is performed using the user records of the users.

6. The method of claim 1, wherein the determining the expected audience measure comprises providing the affinity profiles, user records or the monitored consumption to a machine learning model that is trained to output the expected audience measure.

7. The method of claim 1, further comprising determining, by the one or more processors, an optimal one or more of the time periods to provide the content.

8. The method of claim 7, wherein the optimal one or more of the time periods comprise the time period or time periods having a maximum expected audience size or a maximum expected audience of users with a desired affinity profile or belonging to desired user segment.

9. The method of claim 1, wherein the time periods are time windows during a day or days of the week.

10. The method of claim 1, wherein the generating of the affinity profile is independent of, or is performed without taking into account, data representing socio-economic or demographic status of the users.

11. The method of claim 2, wherein at least one of a), b) or c):

a) the user record for each user does not include any data representing socio-economic or demographic status of the user;

b) the user record for each user is anonymous; or c) the obtaining of metadata, the generating or updating of user records, and the processing of the user records to generate affinity profiles are performed by processing circuitry that does not have access to at least one of or all of data representing socio-economic or demographic status of the users or identity of the users.

12. The method of claim 1, wherein at least one of:

the stored set of affinity categories comprises at least 100 affinity categories or sub-categories; or the metadata concerning the content is obtained from a stored ontology that includes at least 10,000 features that can be used as meta data to represent items of content.

13. The method of claim 1, wherein the user record comprises or represent user activity for different time windows during a day or week, and the method comprises generating different affinity profiles for the user for the different time windows.

14. The method of claim 1, wherein the affinity profile for each user comprises a set of scores, each score being for a respective one of the affinity categories.

15. The method of claim 1, wherein each user is a user account, a plurality of individuals may have access to the user account or wherein a plurality of user devices may be associated with the user account, and wherein the affinity profile for the user account is based on selection of content by the plurality of individuals or using the plurality of user devices.

16. The method according to claim 1, further comprising selecting, by the one or more processors, additional television content or other content to push to the user based on the determined affinity profile for the user.

17. The method according to claim 1, further comprising outputting, by the one or more processors and over the network, the affinity profiles for the plurality of users or the audience category, via an API or operator interface thereby making the affinity profiles available to a third party external to the content distribution system.

18. A system comprising processing circuitry with one or more processors configured to:

obtain, by the one or more processors, affinity profiles for a plurality of users of a content distribution system, the affinity profiles comprising an affinity profile for each user of a plurality of users, wherein each affinity profile comprises a plurality of selected affinity categories and an affinity category score for each of the a plurality of selected affinity categories, and the affinity categories are selected from a stored set of affinity categories, each representing a user's affinity for a respective subject area;

monitor, by the one or more processors and over a network, consumption of items of content or other activity of the plurality of users for past time periods;

select, by the one or more processors, one or more future time periods;

after selecting the one or more future time periods, determine, by the one or more processors, an expected audience measure for the selected one or more future time periods, the expected audience measure being which users of the plurality of users are expected to consume television content of any type during the one or more future time periods or during each of the one or more future time periods, the expected audience measure being determined based on the affinity profiles and the monitored consumption of content or other activity for the past time periods; and categorize, by the one or more processors, each user into one or more of a plurality of user segments based on their affinity profile, wherein the determining the expected audience measure is based on the segments to which the users belong and on the monitored consumption for past time periods, and wherein the determining the expected audience measure comprises determining a likelihood of users belonging to a user segment consuming television content of any type during a selected time of day, the selected time of day corresponding to the selected one or more future time periods.

19. A non-transitory computer-readable medium that comprises computer-readable instructions that are executable to perform a method according to claim 1.

* * * * *